(12) United States Patent
Watase et al.

(10) Patent No.: US 6,997,475 B2
(45) Date of Patent: Feb. 14, 2006

(54) GAS GENERATOR FOR AIR BAG AND AIR BAG APPARATUS

(75) Inventors: Takefumi Watase, Hyogo (JP); Mikio Yabuta, Hyogo (JP)

(73) Assignee: Daicel Chemical Industries, Ltd., Osaka (JP)

( * ) Notice: Subject to any disclaimer, the term of this patent is extended or adjusted under 35 U.S.C. 154(b) by 0 days.

(21) Appl. No.: 10/928,136

(22) Filed: Aug. 30, 2004

(65) Prior Publication Data

US 2005/0029786 A1    Feb. 10, 2005

Related U.S. Application Data

(62) Division of application No. 10/129,325, filed as application No. PCT/JP00/08396 on Nov. 29, 2000, now Pat. No. 6,880,853.

(30) Foreign Application Priority Data

Nov. 29, 1999  (JP)  ................. 11-338037
Nov. 29, 1999  (JP)  ................. 11-338038
Nov. 29, 1999  (JP)  ................. 11-338039

(51) Int. Cl.
   *B60R 21/26* (2006.01)
(52) U.S. Cl. ..................... 280/737; 280/741
(58) Field of Classification Search ............... 280/736, 280/741, 737; 102/530, 531
   See application file for complete search history.

(56) References Cited

U.S. PATENT DOCUMENTS

| | | | |
|---|---|---|---|
| 4,950,458 A | * | 8/1990 | Cunningham ............... 422/164 |
| 4,998,751 A | | 3/1991 | Paxton et al. |
| 5,219,178 A | | 6/1993 | Kobari et al. ............... 280/736 |
| 5,269,561 A | | 12/1993 | Davis et al. |
| 5,433,475 A | | 7/1995 | Kokeguchi .................. 280/736 |
| 5,439,250 A | | 8/1995 | Kokeguchi et al. |
| 5,564,743 A | * | 10/1996 | Marchant .................... 280/741 |
| 5,628,528 A | * | 5/1997 | DeSautelle et al. ......... 280/736 |
| 5,788,275 A | | 8/1998 | Butt et al. ................... 280/737 |
| 5,799,973 A | * | 9/1998 | Bauer et al. ................ 280/741 |
| 5,934,705 A | * | 8/1999 | Siddiqui et al. ............ 280/736 |
| 5,951,042 A | | 9/1999 | O'Loughlin et al. |
| 5,970,880 A | | 10/1999 | Perotto |
| 6,000,718 A | * | 12/1999 | Krupp ....................... 280/736 |
| 6,068,290 A | | 5/2000 | Sheng |

(Continued)

FOREIGN PATENT DOCUMENTS

DE        4009551 A1 *  9/1991

(Continued)

*Primary Examiner*—Ruth Ilan
(74) *Attorney, Agent, or Firm*—Birch, Stewart, Kolasch & Birch, LLP

(57)  ABSTRACT

A gas generator for an air bag capable of easily and unfailingly closing a gas discharging port formed in a housing. An amount of accommodated gas generating agent can be varied and the gas generating agent can be ignited and burnt unfailingly even by ignition devices having normal output. The gas generator has sealing structures as small as possible and a simple structure, and can be manufactured easily. Activation performance and activation timing can be adjusted at multiple stages. For instance, the air bag housing may be provided at its peripheral wall with a plurality of gas discharging ports, an ignition device to be actuated upon impact, and a gas generating agent to be ignited and burnt by the ignition device, wherein the gas discharging ports are arranged in the axial direction of the housing to form a gas discharging port line. Other configurations are also disclosed.

4 Claims, 8 Drawing Sheets

U.S. PATENT DOCUMENTS

| | | | |
|---|---|---|---|
| 6,068,292 A | 5/2000 | Renz | 280/737 |
| 6,095,559 A * | 8/2000 | Smith et al. | 280/741 |
| 6,116,643 A | 9/2000 | Katsuda et al. | |
| 6,234,523 B1 | 5/2001 | Tokoro et al. | 280/737 |
| 6,237,498 B1 | 5/2001 | Winterhalder et al. | |
| 6,314,888 B1 | 11/2001 | Muller et al. | |
| 6,314,889 B1 | 11/2001 | Smith | 102/530 |
| 6,435,552 B1 | 8/2002 | Lundstrom et al. | 280/741 |
| 6,474,685 B1 | 11/2002 | Meixner et al. | 280/741 |
| 6,481,357 B1 | 11/2002 | Lindner et al. | 102/530 |
| 6,547,277 B1 | 4/2003 | Adamini et al. | 280/741 |
| 2003/0137139 A1 | 7/2003 | Iwai et al. | 280/741 |

FOREIGN PATENT DOCUMENTS

| | | |
|---|---|---|
| DE | 195 43 795 A1 * | 5/1997 |
| DE | 198 02 355 A1 * | 7/1999 |
| DE | 299 06 173 U1 | 9/1999 |
| DE | 198 22 654 A1 | 11/1999 |
| EP | 0 578 478 A1 | 1/1994 |
| EP | 0 888 935 A1 | 1/1999 |
| EP | 0 958 973 A2 | 11/1999 |
| GB | 1 554 070 A | 10/1979 |
| JP | 6-183310 A | 7/1994 |
| JP | 7-164986 A | 6/1995 |
| JP | 8-175312 A | 7/1996 |
| JP | 8-207696 A | 8/1996 |
| JP | 9-156451 A | 6/1997 |
| JP | 10-315897 A | 12/1998 |
| JP | 10-329635 A * | 12/1998 |
| JP | 11-245760 A | 9/1999 |

* cited by examiner (a)  (b)

GAS GENERATOR FOR AIR BAG AND AIR BAG APPARATUS

This application is a divisional of application Ser. No. 10/129,325, filed May 6, 2002, now U.S. Pat. No. 6,880,853 which is the national phase under 35 U.S.C. §371 of PCT International Application No. PCT/JP00/08396, which has an international filing date of Nov. 29, 2000, and which designated the United States of America. Priority under 35 U.S.C. §120 to Ser. No. 10/129,325 and to PCT/JP00/08396 is claimed. The disclosure of Ser. No. 10/129,325 and of PCT/JP00/08396 is incorporated by reference.

TECHNICAL FIELD OF THE INVENTION

The present invention relates to a gas generator for an air bag suitably used for an inflating type safety system of an automobile, and more particularly, to a gas generator for an air bag characterized in an arrangement of a gas discharging port, a sealing method thereof and an internal structure of a housing, and to an air bag apparatus using such a gas generator.

PRIOR ART

An air bag system which is mounted on various kinds of vehicles and the like including automobiles, aims to hold the occupant by means of an air bag (bag body) rapidly inflated by a gas when the vehicle collides at a high speed so as to prevent the occupant from crashing into a hard portion inside the vehicle such as a steering wheel, a windscreen due to an inertia and being injured. This kind of air bag system generally comprises a gas generator which actuates upon a collision of the vehicle and discharges a gas, and an air bag which introduces the gas to inflate.

Therefore, in a gas generator used for the air bag system, its outer container (housing) is formed with a gas discharging port for discharging gas into the air bag. Usually, the gas discharging port formed in the housing is closed with a metal seal tape because it is necessary to prevent a metal member accommodated in the housing from being rusted, or, in some cases, a gas generating agent or the like needs to be resistant to moisture.

Conventional gas generators are different in the entire sizes of the housings depending upon installation locations (or uses), such as for a gas generator for a driver side, a gas generator for a front passenger side and a gas generator for side collision. However, most of the gas generators use cylindrical housings, and gas discharging ports are formed in a periphery of the cylindrically formed housing, being lined in the circumferential direction. The gas discharging port formed in the cylindrical surface is closed with a seal tape attached in the circumferential direction. The seal tape is attached from the inside of the housing. Therefore, it is difficult to close the gas discharging port using the seal tape, and especially when the housing is long in the axial direction, it is difficult to close the gas discharging port with the seal tape unless any contrivance is made.

Further, in order to attain reliability in actuating a gas generator, to close the gas discharging port is very important, and the ambient air should never enter the housing.

However, a gas generator capable of easily and reliably closing the gas discharging port has not been provided heretofore.

In the gas generator, a demanded amount of a generated gas varies and an entire shape of the housing also varies in accordance with the installation locations (or uses) such as for a gas generator for a driver side, or a gas generator for a front passenger side, or a gas generator for side collision.

Among these gas generators, as a conventional gas generator disposed on the front passenger side, there is a conventionally widely used gas generator having a cylindrical housing which is long in the axial direction, and in the gas generator, an actuation gas generated in the housing for inflating the air bag is discharged from openings of a plurality of gas discharging ports formed in a peripheral wall of the housing.

The amount of the actuation gas generated for inflating the air bag is generally adjusted by an amount of a gas generating means accommodated in the housing. Therefore, even in the case that the amount of the gas generating means accommodated in the housing is slightly varied, if the same members can be used, it is possible to facilitate the manufacturing of the gas generator and to reduce a manufacturing cost.

Further, since the gas generating agent accommodated in a combustion chamber is ignited and burnt by actuation of an ignition means, there is a case that an ignition means having high output is required for igniting and burning all of the gas generating agent accommodated in the combustion chamber. For example, when the combustion chamber is cylindrical in shape and is long in the axial direction and the ignition means is disposed on one end in the axial direction, in order to burn the gas generating agent accommodated in the other end side by the ignition means, an ignition means having high output capable of discharge a flame up to the other end is required. However, since the ignition means having high output is relatively expensive, such an ignition means is not preferable in view of reduction of a producing cost of the gas generator.

It is desired that the air bag system can safely restrain the occupant even when frame of the occupant (for example, whether a sitting height of the occupant is long or short, whether the occupant is an adult or a child, and the like), a sitting attitude (for example, an attitude of the occupant holding the steering wheel) and the like are different. Then, there has been conventionally suggested an air bag system which actuates by applying as small as possible impact to the occupant at the initial stage of the actuation. Gas generators in such a system are disclosed in JP-A 8-207696, U.S. Pat. Nos. 4,998,751 and 4,950,458. JP-A 8-207696 suggests a gas generator in which one igniter ignites two kinds of gas generating agent capsules so as to generate the gas at two stages. U.S. Pat. Nos. 4,998,751 and 4,950,458 suggest a gas generator in which two combustion chambers are provided for controlling actuation of the gas generator so as to generate the gas at two stages due to expanded flame of the gas generating agent.

However, in such a gas generator, if a structure for sealing the gas generating agent stored in the combustion chamber is provided in the respective chambers, the internal structure is complicated, a size of a container becomes large, and a cost therefor becomes expensive. Accordingly, a gas generator in which the seal structure is eliminated as much as possible is demanded.

Further, it is known that in the gas generator, a demanded amount of a generated gas is different in accordance with installation locations (or uses) such as for a gas generator for a driver side, a gas generator for a front passenger side and a gas generator for side collision. Commonly, the amount of a generated gas is adjusted by an amount of gas generating means accommodated in the housing. Even in the case that the amount of the gas generating means accommodated in the housing is slightly varied, if the same members can be used, it is possible to facilitate the manufacturing of the gas generator and to reduce a manufacturing cost.

DISCLOSURE OF THE INVENTION

Accordingly, the present invention solves the above conventional problems, and provides a gas generator capable of easily and reliably closing the gas discharging port formed in the housing.

A gas generator of the present invention is characterized in that a plurality of gas discharging ports formed in a peripheral wall of a housing are arranged in series along the axial direction of the housing. By forming the gas discharging ports in this manner, a seal tape can be attached in the axial direction, whereby the gas discharging ports can be closed easily and reliably.

In other words, a gas generator for an air bag of the present invention comprises a housing having a plurality of gas discharging ports at its peripheral wall, an ignition means to be actuated upon the impact, and a gas generating means to be ignited and burnt by the ignition means, the ignition means and the gas generating means stored in the housing, wherein the gas discharging ports are arranged in the axial direction of the housing to form a gas discharging port line, two to six gas discharging port lines are arranged close to each other in the circumferential direction of the housing to form a gas discharging port group, and the gas discharging port groups are arranged in the circumferential direction of the housing at predetermined intervals. The gas discharging port lines can comprise a plurality of the gas discharging ports arranged in series in the axial direction of the housing.

Further, the present invention solves the above conventional problems, and provides a gas generator for an air bag which has a simple structure and can be manufactured easily with a lower manufacturing cost, and in that an amount of accommodated gas generating agents can be varied and the gas generating agent can unfailingly be ignited and burnt by the ignition means having normal output.

In the gas generator for the air bag of the present invention, a combustion chamber for accommodating gas generating means and a filter means accommodating chamber for storing a filter means are formed axially adjacent to each other in the housing so as to communicate with each other, the combustion chamber is separated from the filter means accommodating chamber by a partitioning member having a through-hole. With this feature, moisture-proof of the gas generating means can be achieved by closing the gas discharging port even if the moisture-proofing means is not provided between these chambers.

That is, a gas generator for an air bag of the invention comprises a cylindrical housing which is longer in the axial direction than in the radial direction, an ignition means to be actuated upon the impact, and a gas generating means to be ignited and burnt by the ignition means, the ignition means and the gas generating means stored in the housing, wherein a combustion chamber for accommodating gas generating means and a filter means accommodating chamber are formed axially adjacent to each other in the housing to communicate with each other, and the combustion chamber accommodating the gas generating means is separated from the filter means accommodating chamber by a partitioning member having a through-hole.

Further, the present invention solves the above conventional problems, and provides a versatile gas generator which has the simple structure with the minimum sealing structure can be produced easily with a lower manufacturing cost, and can actuates, applying as small as possible impact to the occupant at the initial state of the actuation, and in which the actuation output and timing of output rising can be arbitrarily adjusted to be able to safely restrain the occupant even when frame of the occupant (for example, whether a sitting height of the occupant is long or short, whether the occupant is an adult or a child, and the like), a sitting attitude (for example, an attitude of the occupant holding the steering wheel) and the like are different.

A gas generator for an air bag of the present invention is characterized in that the gas generator has two combustion chambers in a housing, and one of the combustion chambers communicates with a filter means accommodating chamber. If any one of the combustion chambers communicates with a filter means accommodating chamber, sealing in the combustion chamber can be omitted.

In other words, a gas generator for an air bag of the present invention comprises, in a cylindrical housing which is longer in the axial direction than in the radial direction, two ignition means to be actuated upon the impact, and two combustion chambers accommodating the ignition means and gas generating means to be ignited and burnt by the ignition means, wherein the combustion chambers are provided on the opposite ends in the housing, a filter means accommodating chamber for accommodating filter means is provided between these combustion chambers, and either of the combustion chambers communicates with the filter means accommodating chamber.

The gas generator of the present invention is for a gas generator for driver side, a gas generator for a front passenger side and a gas generator for a side collision. The present invention is especially suitable for a gas generator for a front passenger side.

The present invention further proposes a gas generator including a combination of the above constituent elements.

DETAILED DESCRIPTION OF THE INVENTION (1) Gas generator characterized in a Ggs discharging port:

It is preferable that, in the gas discharging port groups, the gas discharging ports adjacent in the circumferential direction of the housing are adjusted to have the center angle therebetween in the range of 10° to 30°, and that the gas discharging port groups are formed in the circumferential direction of the housing at intervals of the center angle of 60° to 120°. Further, the respective gas discharging port lines constituting a gas discharging port group can comprise gas discharging ports having different inner diameters from each other line. For example, a gas discharging port line comprising gas discharging ports having a larger inner diameter and a gas discharging port line comprising gas discharging ports having a smaller inner diameter can be arranged alternately in the circumferential direction of the housing.

Each of the gas discharging port groups comprising the plurality of gas discharging port lines can be closed with one strip of seal tape. Consequently, sealing of a gas discharge port can be facilitated. In this case, it is preferable to adjust a width of the gas discharging port group closed by one strip of seal tape is smaller than that of the seal tape by 2 to 20 mm, more preferably by 2 to 10 mm. This is because the gas discharging ports can be closed more soundly.

Further, according to the present invention, it is possible that the gas discharging port lines comprising a plurality of gas discharging ports arranged in the axial direction of the housing is arranged in the circumferential direction of the housing at predetermined intervals, not arranging two to six gas discharging port lines closer to each other in the circumferential direction of the housing. Also in this gas generator, the gas discharging ports are disposed in the axial direction of the housing.

In other words, a gas generator for an air bag of the present invention comprises, in a housing having a plurality of gas discharging ports at its peripheral wall, an ignition means to be actuated upon the impact, and a gas generating means to be ignited and burnt by the ignition means, wherein the gas discharging ports are arranged in the axial direction of the housing to form a gas discharging port line, and the gas discharging port lines are arranged at predetermined intervals in the circumferential direction of the housing. The gas discharging ports arranged in the axial direction of the housing can be disposed in series in the axial direction of the housing. The gas discharging ports (gas discharging port lines) can be closed by adhering the seal tape straight along the axial direction of the housing. For example, each of the gas discharging port line can be closed by one strip of seal tape.

The gas generator in which the gas discharging ports are arranged in the above-described manner can be realized as a gas generator having a housing which is shorter in the axial direction (e.g., a gas generator for a driver side), but it can exhibit a higher effect when it is realized as the gas generator using a housing which is longer in the axial direction than in the radial direction (e.g., a gas generator for a front passenger side).

An example of the above can be a gas generator in which a housing thereof is longer in the axial direction than in the radial direction, and the combustion chamber for accommodating the gas generating means and the filter means accommodating chamber for accommodating the filter means are formed inside the housing adjacently in the axial direction of the housing. In this case, the gas discharging ports are formed in the part of a peripheral wall of the housing whose interior corresponds to the filter means accommodating chamber. And if the ports are formed in a gas discharging port line or a gas discharging port group arranged along the axial direction of the housing, the ports can be easily and unfailingly closed with the seal tape. Further, a higher effect can be obtained by the present invention in a gas generator in which the housing is longer in the axial direction than in the radial direction, and the gas discharging ports are formed in the vicinity of the center of the housing. An example of the above can be a gas generator in which the housing is longer in the axial direction and the combustion chambers are formed at axially opposite ends in the housing, and the filter means accommodating chamber is formed between these chambers (i.e., in the center of the housing). In such a gas generator, the gas discharging ports are formed in the vicinity of the center of the housing, however, if the gas discharging ports are arranged according to the present invention, the ports can be closed easily and unfailingly.

In the present invention, a metal foil made of various metals can be used as the seal tape. Such a metal foil is formed in a band-like shape and adhered in the housing with a mordant or an adhesive. An aluminum foil is preferable as the metal foil, and the aluminum foil is preferably has a thickness of 50 to 160μ.

The housing having the gas discharging ports as described above can store an ignition means to be actuated by the actuation signal and a gas generating means to generate an actuation gas for inflating the air bag by the ignition means. When the actuation gas is high in temperature and includes combustion products, a coolant and/or filter means made of laminated wire mesh, expanded metal or the like can be disposed if required. Further, members or structures which are constitutionally necessary or members or structures which are advantageous for the actuation can be employed appropriately.

As a gas generating means for generating the actuation gas by combustion, in addition to an azide gas generating agent based on a conventionally and widely used inorganic azide such as a sodium azide, a non-azide gas generating agent not based on an inorganic azide may be used. However, from the view of safety, the non-azide gas generating agent is preferable.

The above gas generator for the air bag is accommodated in a module case together with an air bag (bag body) which inflates by introducing a gas generated by the gas generator, thereby forming an air bag apparatus. In the air bag apparatus, the gas generator is actuated, reacting upon an impact sensor detecting the impact, and a combustion gas is discharged from the gas discharging ports of the housing. The combustion gas flows into the air bag, the air bag breaks the module cover to inflate, thereby forming a cushion absorbing the impact between the passenger and the hard material in the vehicle.

According to the present invention, there can be realized a gas generator which has a simple structure and can be manufactured easily, and in which a charged amount of the gas generating agents can be varied and the gas generating agent can be ignited and burnt unfailingly even by the ignition means having normal output. Especially, by simplifying the seal structure in the combustion chamber, the gas generator for the air bag with a reduced manufacturing cost can be realized.

Further, in the gas generator including the structure combining a flame-transferring tube and a plate member, an amount of gas generating agent accommodated in the combustion chamber can be appropriately varied, and the gas generator can be generally usable.

(2) Gas generator characterized in partitioning member:

The partitioning member functions to block movement of the gas generating means accommodated in the combustion chamber into the filter means accommodating chamber. However, the partitioning member does not function to adjust the internal pressure in the combustion chamber. The combustion pressure in the housing is adjusted only by the opening areas of the gas discharging ports formed in the housing. Therefore, the partitioning member used for such a purpose has a through-hole which is smaller than the gas generator accommodated in the combustion chamber and the total opening area thereof is larger than that of the gas discharging ports. It is preferable that the total opening area of the partitioning member is at least 1.5 times the total opening area of the gas discharging ports. The total opening area of the partitioning member means a sum of the opening areas of the entire through-holes formed in the partitioning member, and the total opening area of the gas discharging ports means a sum of the opening areas of the gas discharging ports formed in the housing.

It is necessary that the partitioning member has a sufficient strength to bear the internal pressure (internal pressure of the combustion chamber at the time of combustion of the gas generator) of the combustion chamber which communicates with the filter means accommodating chamber with each other. To secure the strength, for example, the partitioning member may be formed to curve into a convex shape toward the combustion chamber. The partitioning member formed in such a shape can hardly be deformed by the combustion pressure of the gas generating means in the combustion chamber.

Since a plurality of the through-holes formed in the partitioning member are not closed with a seal tape or the like, the combustion chamber and the filter means accommodating chamber always communicates with each other. Meanwhile, the cylindrical housing is formed with the gas discharging ports for introducing the actuation gas generated in the housing into the air bag (bag body). Thereupon, if the gas discharging port is closed with the seal tape or the like for example, the moisture is prevented by the seal tape closing the gas discharging ports. In this case, even if a seal structure is not provided in the combustion chamber, moisture-proof of the gas generating agents in the housing and the combustion chamber and rust proofing of inner metal members can be achieved. That is, by simplifying the seal structure in the combustion chamber, a gas generator which can be manufactured with a lower cost is realized. An amount of an actuation gas for inflating air bag is usually adjusted in accordance with an amount of the gas generating agents accommodated in the combustion chamber. Thus, if the amount of the accommodated gas generating agent can be varied in accordance with the required amount of a generated actuation gas, it is possible to adjust an amount of a generated gas in a wide range in a single gas generator. However, even if an amount of the accommodated gas generating agents is varied, ignition and combustion by the ignition means have to be performed unfailingly, and additionally, it if preferable to block movement of the gas generating agent in order to prevent the gas generating agent from being damaged by vibration.

Thereupon, the present invention also provides a gas generator for an air bag in which an inwardly flange-shaped plate member is disposed in the combustion chamber provided in the cylindrical housing to support the gas generating agents and the plate member presses and/or holds the gas generating means in the combustion chamber. An amount of the stored gas generating agents can be adjusted by arranging the plate member to be able to slide in the axial direction of the housing. For example, the plate member can be inserted into the combustion chamber to press the gas generating agents stored in the combustion chamber against the partitioning member towards the filter means accommodation chamber side. With this structure, even if an amount of the accommodated gas generating agent is slightly varied, the gas generating agent in the combustion chamber is fixed by the plate member and the partitioning member, and the gas generating agent can be prevented from being damaged by the vibration.

In the present invention, in order to realize a gas generator in which the ignition means unfailingly ignites and burns the gas generating agents regardless of variation in an amount of the accommodated gas generating agent, preferably, the flame-transferring tube provided at its peripheral wall with a plurality of flame-transferring holes is disposed in the combustion chamber.

In other words, the invention provides a gas generator for an air bag comprising, in a cylindrical housing which is longer in the axial direction than in the radial direction, an ignition means to be actuated upon the impact, and a gas generating means to be ignited and burnt by the ignition means, wherein a combustion chamber for accommodating the gas generating means and a filter means accommodating chamber for accommodating a filter means are formed in the housing adjacent to each other in the axial direction, a flame-transferring tube provided at its peripheral wall with a plurality of flame-transferring holes is accommodated inside the combustion chamber, the flame-transferring tube extends in the axial direction of the housing, and an end of the tube is connected into an ignition means accommodating chamber in which the ignition means is accommodated.

The flame-transferring tube extends in the axial direction of the housing, and an end of the tube is connected into the ignition means accommodating chamber in which the ignition means is accommodated. Further, when the gas generating agent is supported by the plate member, the flame-transferring tube can be formed to project into the accommodation space of the gas generating means through the central opening of the plate member, and it is preferable that a part or all of the plurality of flame-transferring holes formed in the flame-transferring tube exist inside the accommodation space of the gas generating means. With this design, a flame generated by the actuation of the ignition means is not blocked by the plate member, passes through the flame-transferring tube and ejects into the combustion chamber from the flame-transferring holes, and thereby the gas generating agent in the combustion chamber can reliably be ignited and burnt.

Especially, in the gas generator of the present invention, since the combustion chamber and the filter means are formed adjacent to each other in the axial direction of the housing, it is possible to shorten the distance of the combustion chamber in the longitudinal direction. In this structure, for example, the ignition means can be made more simple than that in a structure in which the cylindrical filter is disposed in the housing and the combustion chamber is defined therein. In other words, when the combustion chamber is provided in the filter means, the combustion chamber is formed longer in the axial direction and thus, in order to ignite and burn the gas generating agent accommodated in the end of the combustion chamber, an amount of the transfer charge constituting the ignition means has to be increased, or a complicated and expensive ignition system (ignition means) using a detonating fuse is needed. However, when the combustion chamber and the filter means accommodating chamber are disposed as described above, the distance in the longitudinal direction of the combustion chamber can be shortened, and the gas generating means can be ignited and burnt by a normal ignition means.

The cylindrical housing forming the outer container of the gas generator can comprise a cylindrical diffuser shell provided at its peripheral wall with a plurality of gas discharging ports, and closure shells for closing the opposite end openings of the peripheral wall. A plurality of the gas discharging ports formed in the peripheral wall of the diffuser shell are formed in the part where the filter means accommodating chamber (which will be described later) is provided. The closure shell for closing the opening of the diffuser shell closer to the combustion chamber can comprise an annular portion and a cylindrical portion projecting outwardly in the axial direction of the housing, and the ignition means can be accommodated inside the cylindrical portion. If the housing is formed in this manner, the diffuser shell can be formed only by forming the gas discharging ports in the peripheral wall of the metal straight tube, and thereby the manufacturing cost can be reduced. Further, if the ignition means is accommodated in the cylindrical portion projecting out of the housing, the maximum space can be secured in the combustion chamber.

The filter means for cooling a combustion gas generated by the combustion of the gas generating means can be disposed in the filter means accommodating chamber. This filter means is disposed in the housing for cooling and/or purifying a combustion gas generated by the combustion of the gas generating means. For example, it is possible to use a filter for purifying the combustion gas and/or a coolant for cooling a generated combustion gas which have been conventionally used, and a laminated wire-mesh filter or the like formed by compression-molding an annular laminated wire-mesh body made of an appropriate material. The filter means can be formed in to a double structure having different pressure losses inside and outside, a function for protecting the filter means may be provided inside, and a function for suppressing inflation of the filter means may be provided outside. The filter means is not limited to the wire mesh formed with the wire rods, and an expanded metal formed into a cylindrical shape can be used as the filter means. If an outer periphery of the filter means is supported by an outer layer comprising a laminated wire mesh body or a porous cylindrical body or an annular belt or the like, the inflation of the filter means can be suppressed.

It is preferable that the filter means is disposed after a gap having a predetermined width is secured between the inner peripheral surface of the housing and the filter means. By forming the gap between the outer peripheral surface of the filter means and the inner peripheral surface of the housing, such a possibility that, when a combustion gas passes through the filter means, the gas is concentrated on a portion of the filter means in the vicinity of the gas discharging ports can be eliminated, and, in fact, all portions of the filter means can be utilized.

Thereupon, the present invention also provides a gas generator in which, in order to dispose the filter means with the gap obtained between the inner peripheral surface of the housing and the filter means, the housing comprises a cylindrical diffuser shell provided at the peripheral wall with a plurality of gas discharging ports and closure shells for closing the opposite end openings of the peripheral wall, and the filter means is supported and fixed by the closure shell closing the opening in the filter means accommodating chamber side. In this gas generator, the closure shell comprises an annular portion connected to an opening edge of the diffuser shell, a circular portion projecting from the annular portion toward the filter means accommodating chamber, and a screw portion projecting from the annular portion to the outside of the housing. The circular portion can be formed to abut against and support an inner peripheral surface of the filter means. When the filter supporting member having an inner peripheral wall of an annular portion projecting into a hollow portion of the filter means and an outer peripheral wall fitted into the housing is disposed on the filter means in the combustion chamber side, the inner surface of the filter means can be supported by the inner peripheral wall of the filter means supporting member and the circular portion of the diffuser shell.

As the gas generating means stored in the combustion chamber, in addition to an azide gas generating agent based on an inorganic azide which has been widely used, for example, a sodium azide, a non-azide gas generating agent not based on an inorganic azide may be used. However, from the view of safety, the non-azide gas generating agent is preferable.

The above gas generator for the air bag is accommodated in a module case together with an air bag (bag body) which inflates by introducing a gas generated by the gas generator, thereby forming an air bag apparatus. In the air bag apparatus, the gas generator is actuated reacting upon the impact sensor detecting the impact and a combustion gas is discharged from the gas discharging ports of the housing. The combustion gas flows into the air bag, the air bag breaks a module cover and inflates, and form a cushion absorbing the impact between the passenger and the hard material in the vehicle.

According to the present invention, there can be realized a gas generator which has a simple structure and can be manufactured easily, and in which a charged amount of the gas generating agents can be varied and the gas generating agent can be ignited and burnt unfailingly even by the ignition means having normal output. Especially, by simplifying the seal structure in the combustion chamber, the gas generator for the air bag with a reduced manufacturing cost can be realized.

Further, in the gas generator including the structure combining a flame-transferring tube and a plate member, an amount of gas generating agent accommodated in the combustion chamber can be appropriately varied, and the gas generator can be generally usable.

(3) Gas generator characterized in two ignition means and two combustion chambers, and in that one of the combustion chambers communicates with the filter means accommodating chamber:

In the gas generator formed in this manner, if one of the combustion chambers communicates with the filter means accommodating chamber, moisture-proof of the gas generating agents in the combustion chamber and rustproofing of inner metal members can be achieved only by sealing a plurality of the gas discharging ports formed in the peripheral wall of the cylindrical housing, and it is possible to simplify the sealing structure in the combustion chamber. That is, if the gas discharging ports are provided with various kinds of sealing structures such that the gas discharging port is closed with a seal tape, moisture-proof of the gas generating agents in the combustion chamber communicating with the filter accommodating means and rust proofing of the inner metal members can be achieved.

When a cup member having a plurality of through-holes is disposed in one of ends of the housing, either of the two combustion chambers, which are provided at the opposite ends of the housing, can be defined inside the cup member. In this case, by closing the through-holes with a closing member, the combustion chamber inside the cup member and the filter means accommodating chamber can be defined. The closing member for closing the through-hole can be a stainless foil having a thickness of 20 to 80 $\mu$m. Such a stainless foil can be adhered on the inner or outer side of the cup member using various mordants or adhesives. Another appropriate example of the closing member can be the one which ruptures due to combustion of the gas generating means accommodated in the combustion chamber defined inside the cup member but never ruptures due to combustion of the gas generating means in the other combustion chamber which communicates with the filter means accommodating chamber.

It is preferable that a plurality of the through-holes in the cup member are formed in its peripheral wall. Usually, a flame and gas discharged from the other chamber pass through the axial space of the filter means and strike directly against the bottom of the cup member. With the through-holes formed in the peripheral wall of the cup member, it is possible to evade the direct ejection of a flame and gas from the other chamber towards the bottom of the cup member. In addition, when the through-holes are formed in the peripheral wall of the cup member, a flow-path is preferably formed between the outer periphery of the cup member and the inner periphery of the housing to lead from the through-holes to the filter means accommodating chamber.

A partitioning member which has a plurality of through-holes can be disposed inside the combustion chamber which communicates the filter means accommodating chamber so that the partitioning member sections these chambers. The partitioning member has a function to block movement of the gas generating means accommodated in the combustion towards the filter means accommodating chamber. The partitioning member does not have a function to adjust the internal pressure in the combustion chamber which communicates with the filter means accommodating chamber. The combustion pressure in the housing is adjusted only by the opening area of the gas discharging ports formed in the housing. Therefore, the partitioning member used for such a purpose has a through-hole which is smaller than the gas generating means accommodated in the combustion chamber and the total opening area thereof is larger than that of the gas discharging ports. It is preferable that the total opening area of the partitioning member is at least 1.5 times of the total opening area of the gas discharging ports. In this description, the total opening area of the partitioning member means a sum of the opening areas of all through-holes formed in the partitioning member, and the total opening area of the gas discharging ports means a sum of the opening areas of the gas discharging ports formed in the housing.

It is necessary that the partitioning member has a sufficient strength to bear the internal pressure (internal pressure at the time of combustion of the gas generating means) of the combustion chamber which communicates with the filter means accommodating chamber. To secure such a strength, for example, the partitioning member may be formed curved into a convex shape toward the combustion chamber. The partitioning member formed in such a shape can hardly deformed by the combustion pressure of the gas generating means in the combustion chamber.

Openings at the opposite ends of the cylindrical housing have to be closed. Thereupon, in the present invention, the housing comprises a cylindrical diffuser shell provided at its peripheral wall with a plurality of gas discharging ports and closure shells closing the opposite end openings of the peripheral wall. A plurality of the gas discharging ports provided in the peripheral wall of the diffuser shell is formed in the area where the filter accommodating means chamber (which will be described later) is provided. And the closure shell can comprise an annular portion and a cylindrical portion projecting in the axial direction out of the housing, and the ignition means can be accommodated inside the cylindrical portion. By accommodating the ignition means in the cylindrical portion projecting out of the housing, the maximum space can be obtained in the combustion chamber. If the cylindrical portion projects in the axial direction out of the housing and the periphery thereof is threaded, the gas generator can be mounted to the module by threading the nut to the cylindrical portion.

An inwardly flange-shaped plate member can be disposed in the combustion chamber provided in the cylindrical housing. By disposing the plate member to be able to slide in the axial direction of the housing, the charged amount of the gas generating means can be adjusted. For example, the plate member can be fitted into the combustion chamber and have a function to press the gas generating means accommodated in the combustion chamber toward the filter means accommodating chamber side, i.e., the partitioning member. With this design, even if an amount of the accommodated gas generating agents is slightly varied, the gas generating agent in the combustion chamber is held and fixed by the plate member and the partitioning member, and thereby the gas generating agent can be prevented from being damaged by the vibration. The plate member fitted into the combustion chamber can be realized by a tube provided with an inwardly flange-shaped plate member. In the plate member formed in such a shape, a flange-like portion can press and/or hold the gas generating means accommodated in the combustion chamber towards the filter means accommodating chamber side.

Especially, among a plurality of the combustion chambers, even if an accommodated amount of the gas generating means is changed in either of the combustion chambers, preferably, the flame-transferring tube formed at its peripheral wall with a plurality of flame-transfer ring holes and extending in the axial direction of the housing, and an end of the flame-transferring tube is connected to the interior of the cylindrical portion of the closure shell so that the gas generating means is unfailingly ignited and burnt by the ignition means. The flame-transferring tube can be formed to pass through the central opening of the plate member and project into the accommodation space of the gas generating means. And, preferably, a part or all of the plurality of flame-transferring holes formed in the flame-transferring tube exist inside the accommodation space of the gas generating means. By forming in the above manner, a flame of the ignition means is not blocked by the plate member, passes inside the flame-transferring tube and ejects from the flame-transferring holes formed in the peripheral wall, and the gas generating means existing therearound can be ignited and burnt.

The gas generating means accommodated in each of the combustion chambers is for inflating an air bag to restrain the passenger using a combustion gas generated by the combustion of the gas generating means. Therefore, even if the ignition means includes a transfer charge which is ignited and burnt by the igniter to burn the gas generating means, a combustion gas generated by the combustion of the transfer charge is for burning the gas generating means, and is not for inflating the air bag. In this point, both can be clearly distinguished from each other. Further, the two combustion chambers provided in the housing are for accommodating the gas generating means only. Thus, even if the ignition means includes the transfer charge and the transfer charge is accommodated in the defined space (referred to as "accommodation chamber", hereinafter), the accommodation chamber of the transfer charge and the combustion chamber for accommodating the gas generating means can be clearly distinguished from each other.

As such a gas generating means, in addition to an azide gas generating agent based on an inorganic azide which has been widely used, for example, a sodium azide, a non-azide gas generating agent not based on an inorganic azide may be used. However, from the view of safety, the non-azide gas generating agent is preferable, and as the non-azide gas generating composition, for example, a composition mainly containing a nitrogen containing organic compound such as a tetrazole, a triazole or a metallic salt thereof and an oxygen containing oxidant such as an alkali metal nitrate, a composition using a triaminoguanidinenitrate, a carbohydroazide, a nitroguanidine and the like as a fuel and nitrogen source and using a nitrate, chlorate, a perchlorate or the like of an alkali metal or an alkaline earth metal as an oxidant, and the like may be employed. In addition, the gas generating means can be suitably selected according to requirements such as a burning rate, a non-toxicity, a combustion temperature, a decomposition starting temperature.

In the two combustion chambers formed in the housing, it is possible to use gas generating means having different burning rates from each other. In this case, in the respective combustion chambers, may be used the gas generating means having the different composition or composition ratio itself from each other, such that, for example, the inorganic azide such as the sodium azide or the non-azide such as the nitroguanidine is used as the fuel and the nitrogen source. Alternatively, the gas generating means obtained by changing a shape of the composition to a pellet shape, a wafer shape, a hollow cylindrical shape, a disc shape, a single hole body shape or a porous body shape, or the gas generating means obtained by changing a surface area according to a size of a formed body may be used. In particular, when the gas generating means is formed into the porous body with a plurality of through-holes, an arrangement of the holes is not particularly limited, however, in order to stabilize a performance of the gas generator, an arrangement structure such that a distance between an outer end portion of the formed body and the center of the hole and a distance between each center of the holes are substantially equal to each other is preferable. Concretely, in the cylindrical body having a circular cross section, for example, a preferred structure is such that one hole is arranged at the center and six holes are formed around the hole so that the center of each hole is the apex of regular triangles of the equal distances between the holes. Further, in the same manner, arrangement such that eighteen holes are formed around one hole at the center maybe also suggested. However, the number of holes and the arrangement structure are determined in connection with an easiness for manufacturing the gas generating agent, a manufacture cost and a performance, and are not particularly limited.

The filter means for cooling a combustion gas generated by the combustion of the gas generating means is disposed in the filter means accommodating chamber provided between the two combustion chambers. The filter means is disposed in the housing for cooling and/or purifying a combustion gas generated by combustion of the gas generating means. For example, in addition to a filter for purifying the combustion gas and/or a coolant for cooling the combustion gas generated which are conventionally used, a laminated wire mesh filter obtained by compression-molding a laminated annular wire-mesh body made of an appropriate material can be used. The filter means can be formed into a double structure having different pressure losses inside and outside, a function for protecting the filter means may be provided inside, and a function for suppressing expansion of the filter means may be provided outside. The material of the filter means is not limited to a wire mesh made of wire rods, but an expanded metal formed into a cylindrical shape can be used as the filter means. And an outer periphery of the filter means is supported by an outer layer comprising a laminated wire mesh body, a porous cylindrical body or an annular belt so that expansion of the filter means can be suppressed.

The filter means is supported by the filter means supporting member and fixed inside the housing so that a gap with a predetermined width is obtained between the inner peripheral surface of the housing and the filter means. Because of the gap obtained between the outer peripheral surface of the filter means and the inner peripheral surface, a combustion gas does not concentrate in the vicinity of the gas discharge ports while passing through the filter means, and thereby all portions of the filter means can be utilized.

In the housing, the ignition means which detects the impact and then actuates to ignite and burn the gas generating means is also accommodated. In the gas generator of the present invention, an electric ignition type ignition means which is actuated by an electric signal (or actuation signal) transmitted from the impact sensor or the like detecting the impact is used as the ignition means. The electric ignition type ignition means comprises an igniter to be actuated based on an electric signal transmitted from an electric sensor detecting the impact exclusively with an electrical mechanism such as a semiconductor acceleration sensor, and a transfer charge to be ignited and burnt by the actuation of the igniter.

The above gas generator for the air bag is accommodated in a module case together with an air bag (bag body) which inflates by introducing a gas generated by the gas generator, thereby forming an air bag apparatus. In the air bag apparatus, the gas generator is actuated reacting upon the impact sensor detecting the impact and discharges a combustion gas from the gas discharging ports of the housing. The combustion gas flows into the air bag, the air bag breaks the module cover and inflates to form a cushion absorbing the impact between the passenger and the hard structure in the vehicle.

According to the present invention, there can be realized a gas generator in which the entire size of the container is small, the generator can be manufactured easily with a simple structure and can actuates, applying as small as possible impact to the occupant at the initial state of the actuation, and in that the actuation output and timing of output rising can be arbitrarily adjusted to be able to safely restrain the occupant even when frame of the occupant (for example, whether a sitting height of the occupant is long or short, whether the occupant is an adult or a child, and the like), a sitting attitude (for example, an attitude of the occupant holding the steering wheel) and the like are different.

Further, in the gas generator of the present invention, sealing structures can be reduced by making one of the combustion chambers communicate with the filter means accommodating chamber. In the gas generator including a structure combining the flame-transferring tube and the plate member, an amount of the gas generating agent accommodated in the combustion chamber can be appropriately varied, and thereby the gas generator which can be generally usable is provided.

Figure 1:
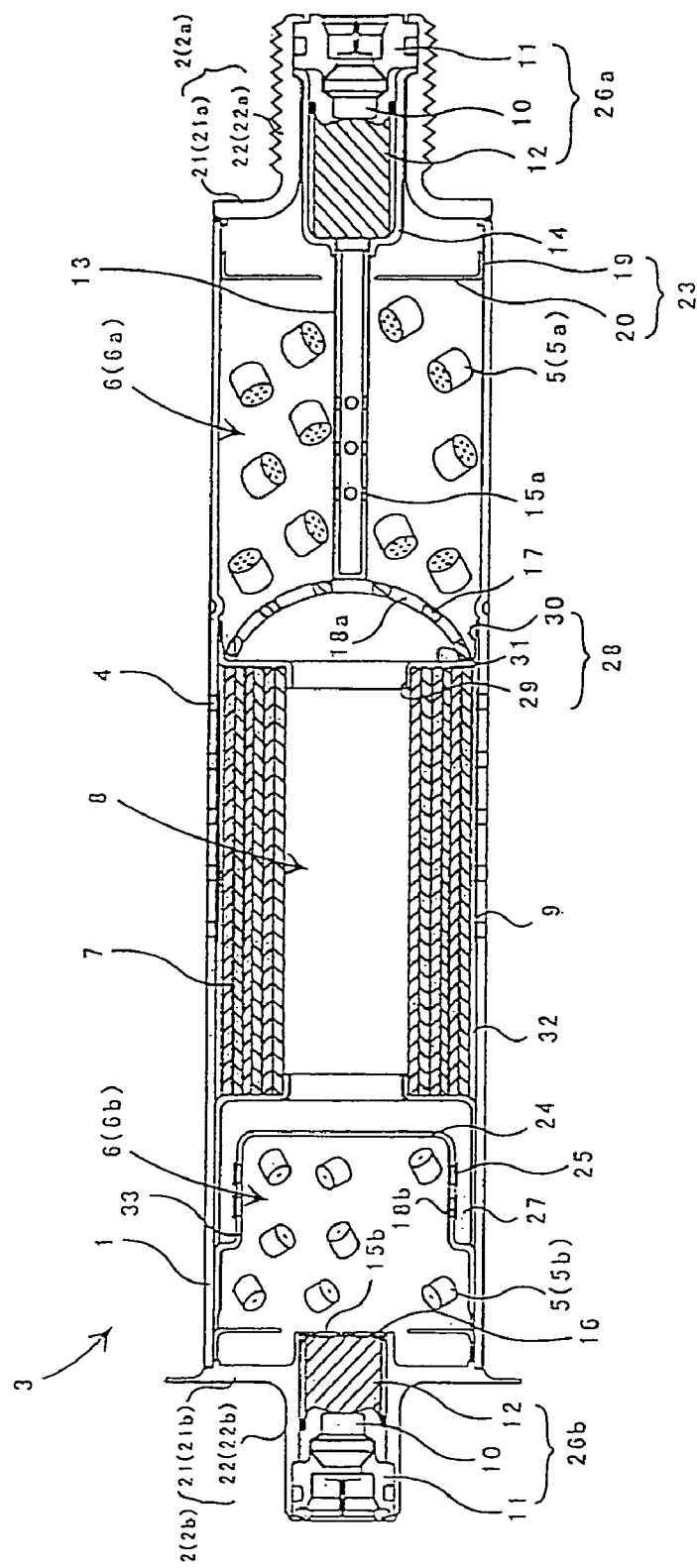
FIG. 1 is a cross sectional view in the longitudinal direction showing an embodiment of a gas generator (1) for an air bag of the present invention.

REFERENCE OF NUMERALS 1 diffuser shell
3 housing
4 gas discharging port
5 combustion chamber
6 gas generating agent
7 filter means
8 filter means accommodating chamber
9 seal tape
13 flame-transferring tube
17 baffling member
50 gas discharging port line
60 gas discharging port group
101 diffuser shell
102 closure shell
103 housing
104 gas discharging port
105 combustion chamber
106 filter means accommodating chamber
107 gas generating agent
108 flame-transferring tube
110 baffling member
112 filter means supporting member
113 igniter
115 filter means
117 seal tape
118 plate member
201 diffuser shell
202a first closure shell
202b second closure shell
203 housing
204 gas discharging port
205a first gas generating agent
205b second gas generating agent
206a first combustion chamber
206b second combustion chamber
207 filter means
208 filter means accommodating chamber
209 seal tape
213 flame-transferring tube
217 baffling means
218 through-hole
223 plate member
224 cup member
225 closing member
226a first ignition means
226b second ignition means
228 filter means supporting member

PREFERRED EMBODIMENTS OF THE INVENTION

A gas generator for an air bag according to the present invention will be described below according to the embodiments shown in the accompanying drawings.

Embodiment 1

FIG. 1 is a vertical cross sectional view of a first embodiment of a gas generator for an air bag according to the present invention.

The gas generator has a housing 3 formed by integrally uniting a cylindrical diffuser shell 1 having a gas discharging port 4 and closure shells 2 which close openings in ends of the diffuser shell 1. A plurality of gas discharging ports are formed in the peripheral wall of the cylindrical housing 3, being arranged along the axial direction of the housing as described below. And in the housing 3, combustion chambers 6 for accommodating gas generating agents 5 as gas generating means are formed on both sides (i.e., on the closure shells sides) in the axial direction. A filter means accommodating chamber 8 for accommodating a cylindrical filter means 7 is provided between the combustion chambers 6, i.e., in the vicinity of the center of the housing 3. In describing this embodiment, the right side combustion chamber in the drawing is defined as a first combustion chamber 6a and the left side combustion chamber is defined as a second combustion chamber 6b. The first combustion chamber 6a communicates with the filter means accommodating chamber 8.

Figure 2:
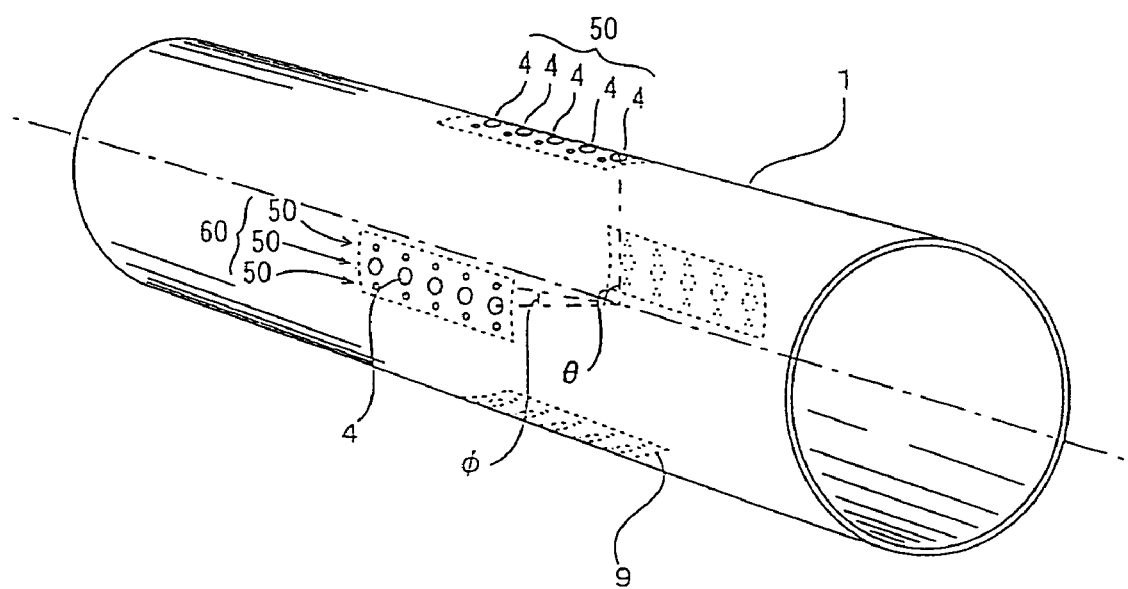
FIG. 2 is a perspective view showing a diffuser shell of the gas generator shown in FIG. 1.
Figure 3:
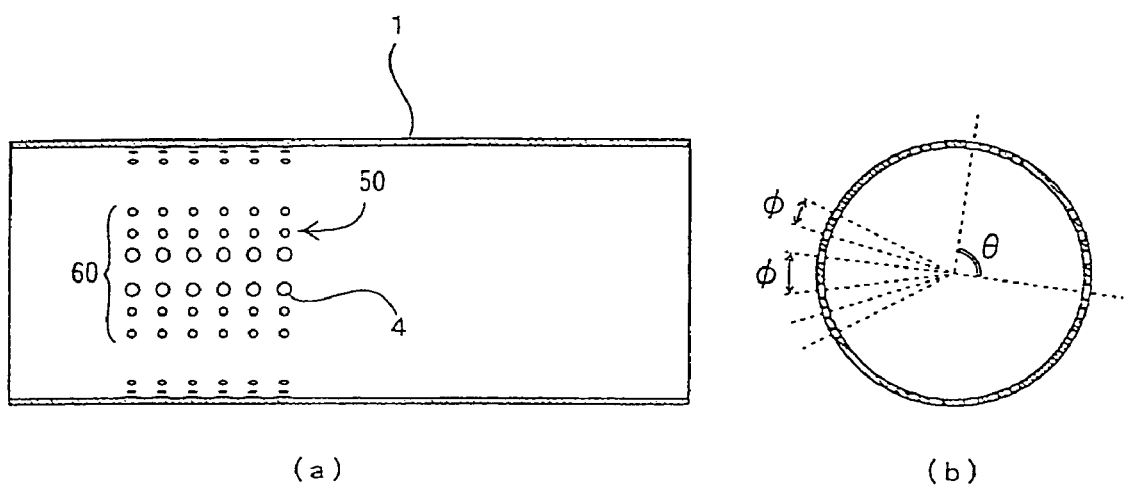
FIG. 3 are cross sectional views showing a diffuser shell of other embodiment, wherein (a) is a cross sectional view in the a longitudinal direction, and (b) is a cross sectional view in the direction perpendicular to the longitudinal direction.

As shown in FIG. 2, the diffuser shell 1 is formed with a cylindrical straight tube. In a part of peripheral wall of the diffuser shell 1 in which the filter means accommodating chamber 8 is provided, a plurality of the gas discharging ports 4 are aligned straight in the axial direction of the housing 3 to form a gas discharging port line 50. Two to six gas discharging port lines 50 are arranged close to each other, thereby forming a gas discharging port group 60. In this embodiment, a gas discharging port group 60 consists of three gas discharging port lines 50 arranged close to each other. The gas discharging port groups 60 are provided at predetermined intervals (preferably, at the central angle of 60° to 120°) in a circumferential direction of the housing 3, and in this embodiment, the gas discharging port groups 60 are provided at intervals of 90°. In the drawing, an interval between the gas discharging port groups is shown in the interior angle θ formed between gas discharging port groups adjacent to each other in the circumferential direction. In the gas discharging port group 60, it is preferable that the gas discharging ports 4 which are adjacent to each other in the circumferential direction are adjusted so that the central angle φ therebetween is in the range of 10° to 30°. Further, in this embodiment, the gas discharge port lines 50 constituting a gas discharging port group 60 have the gas discharging ports 4 having different inner diameters respectively, but it is naturally possible to form the gas discharging port group 60 by arranging two to six gas discharge port lines 50 having gas discharging ports 4 in the same size. In relation to the arrangement of the gas discharging ports, as shown in FIG. 3a of the cross sectional view taken along the longitudinal direction, six gas discharging ports 4 may be arranged in the axial direction of the housing 3 to form a gas discharging port line 50, and six gas discharging port lines 50 may be arranged close to each other in the circumferential direction of the housing 3 to form a gas discharging port group 60. As shown in FIG. 3b of the cross sectional view taken along a direction perpendicular to the longitudinal direction, four gas discharging port groups 60 may be arranged in the circumferential direction of the housing 3 at intervals of the central angle (θ) 90°. In an example shown in FIGS. 3a and 3b, among six gas discharging port lines 50 constituting the gas discharging port groups 60, two gas discharging port lines 50 in the middle comprise gas discharging ports 4 having a larger inner diameter, and respective two gas discharging port lines 50 arranged on the opposite sides of the two gas discharging port lines 50 in the middle comprise gas discharging ports 4 having a smaller inner diameter.

Figure 4:
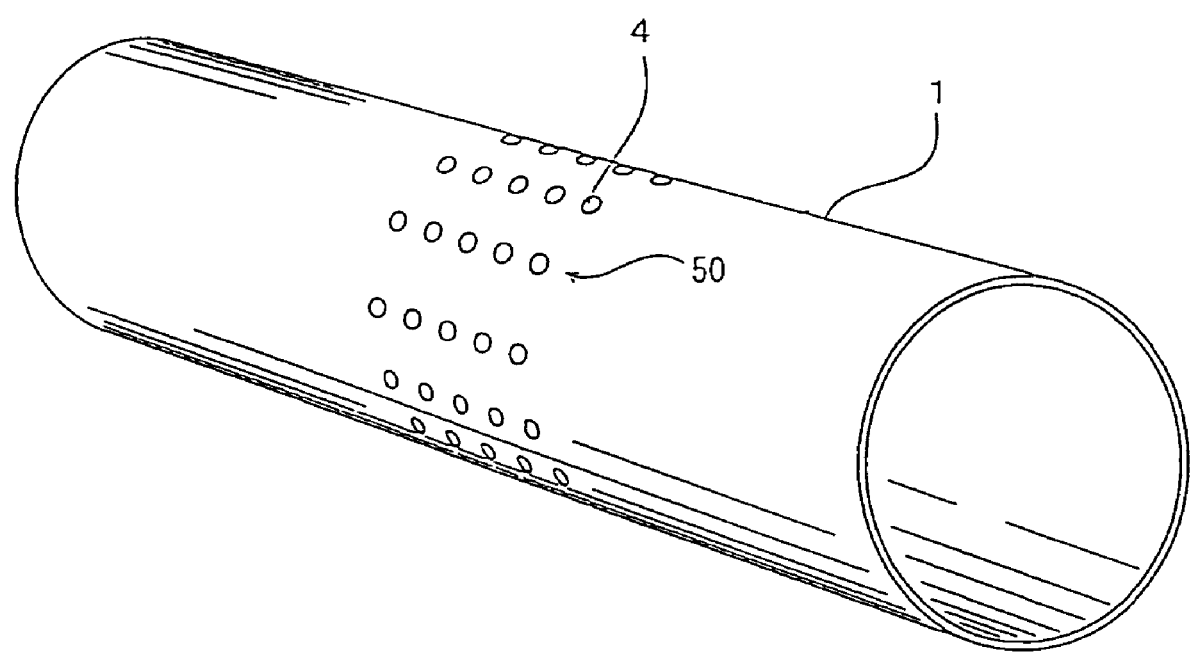
FIG. 4 is a perspective view showing a diffuser shell in other embodiment.

Further, as shown in FIG. 4, the gas discharging port lines 50 can be arranged independently in the circumferential direction without arranging two to six gas discharging port lines 50 close to each other to form the gas discharging port group. In this case, the gas discharging port lines are arranged at predetermined intervals in the circumferential direction of the housing. The gas discharging ports 4 have function to adjust the internal pressure of the housing 3 when the gas generating agents 5 are burnt, and the total opening area of the gas discharging ports 4 is determined based on characteristics and the like of the gas generating agents 5 accommodated in each of the combustion chambers 6.

The gas discharging port 4 is closed with a seal tape 9 made of aluminum for preventing moisture. In the present invention, since the gas discharging ports 4 are arranged as a gas discharging port line or a gas discharging port group straight along the axial direction of the housing 3, the gas discharging port 4 can be closed with the seal tape 9 extending zonally along the axial direction of the housing 3. That is, since it is unnecessary to stick the seal tape 9 in the circumferential direction of the housing 3, the seal tape 9 can be pasted easily. It is preferable that the seal tape 9 for closing the gas discharging port is formed wider than the gas discharging port line 50 or the gas discharging port group 60 by 2 to 20 mm.

Each closure shell 2 comprises an annular portion 21 connected to an opening end of the diffuser shell 1 and a cylindrical portion 22 integrally connected to a central opening of the annular portion. This cylindrical portion 22 projects outwardly in the axial direction of the housing 3, and an ignition means 26 is accommodated in the inner space of the cylindrical portion 22. In this embodiment, the first closure shell 2a for closing the end opening in the first combustion chamber 6a side comprises a cylindrical portion 22a and an annular portion 21a connected to an end of the cylindrical portion 22a in a flange-like manner. The second closure shell 2b for closing the end opening in the second combustion chamber 6b side comprises a cylindrical portion 22b and an annular portion 21a which is perpendicular to a peripheral wall of the cylindrical portion 22b in a flange-like manner. The cylindrical portions 22a and 22b of the first and second closure shells 2a and 2b accommodate therein first and second ignition means 26a and 26b, respectively. Each of the first and second ignition means 26a and 26b comprises an igniter 10 accommodated in an igniter collar 11, and a transfer charge 12 to be ignited and burnt by the igniter 10. The cylindrical portion 22a of the first closure shell 2a is closed with a cap member 14 connected to an end of the flame-transferring tube 13, and the cylindrical portion 22b of the second closure shell 2b is closed with a porous disk-like cover member 16. The cover member 16 is provided with a plurality of flame-transferring holes 15b in the second combustion chamber side 6b. The peripheral wall of the flame-transferring tube 13 connected to the cap member 14 is provided with a plurality of flame-transferring holes 15a, and the inner space thereof communicates with an interior of the cylindrical portion 22a of the first closure shell 2a.

In the present embodiment, the peripheral edge of the annular portion 21b forming the second closure shell 2b is formed such as to project outwardly in the radial direction of the diffuser shell 1. With this design, the annular portion 21b can function as a flange when the gas generator is mounted to a module. A screw groove (screw groove having a pitch of 1.0 mm with respect to a diameter of 22 mm of the cylindrical portion 22a, for example) is formed in an outer peripheral surface of the cylindrical portion 22a in the first closure shell 2a. As a result, if a nut is incorporated in the cylindrical portion 22a, it can function as a stud bolt when the gas generator is mounted to a module case.

The first combustion chamber 6a formed in the right side of the housing 3 in the drawing is partitioned from the filter means accommodating chamber 8 by a partitioning member.

In the present embodiment, a baffling member 17 curved into a convex shape toward a first ignition means 26a is used as the partitioning member. The baffling member 17 has a function for preventing a gas generating agent 5a from moving toward the filter means accommodating chamber 8. The baffling member 17 is formed with a plurality of through-holes 18a which makes the first combustion chamber 6a communicate with the filter means accommodating chamber 8. The through-holes 18a are not closed with the seal tape or the like but are opened, and the first combustion chamber 6a always communicates with the filter means accommodating chamber 8. With this design, moisture-proof of the gas generating agents 5a accommodated in the first combustion chamber 6a and rust proofing of inner metal member can be achieved only by sealing the gas discharging ports 4 formed in the peripheral wall of the cylindrical housing 3, and the sealing structure can be simplified. Incidentally, the through-holes 18a formed in the baffling member can be appropriately closed with a seal tape so that, when the seal tape is ruptured by combustion of the gas generating agent, both the chambers communicates with each other. The porous cylindrical first gas generating agents 5a are accommodated in the first combustion chamber 6a. The gas generating agents 5a are supported by an inwardly shaped plate member 23 like a flange with a central opening which the flame-transferring tube 13 passes through. A peripheral wall 19 of the plate member 23 is fitted into a combustion chamber 6a, and the gas generating agent 5a is supported by a flange 20 connected to the peripheral wall 19. With this design, movement of the gas generating agents 5a is blocked and thus, possible damages to the gas generating agents 5a caused by vibration or the like can be avoided. Further, since the plate member 23 is fitted inwardly such that the plate member 23 can slide in the axial direction of the housing 3, even if the amount of the accommodated gas generating agents 5a is varied, the gas generating agents 5a can reliably be supported, pressed and/or held.

The gas generating agent 5a accommodated in the combustion chamber 6a is supported by the plate member 23 and flame of the ignition means 26a is reliably ejected into the combustion chamber 6a by the flame-transferring tube 13. Therefore, even if the amount of the gas generating agent 5a accommodated in the combustion chamber 6a is varied, the gas generating agent 5a is reliably be ignited and burnt.

The baffling member 17 having the through-holes 18a supports the gas generating agent 5a accommodated in the first combustion chamber 6a to prevent the gas generating agent 5a from moving into the filter means accommodating chamber 8. The baffling member 17 does not have a function of adjusting the combustion internal pressure in the first combustion chamber 6a. Therefore, the through-holes 18a are adjusted such that inner diameter thereof is smaller than the first gas generating agent 5a, and a total opening area of the through-holes 18a are larger than a total opening area of the gas discharging ports 4.

Further, the second combustion chamber 6b on the left side of the housing 3 in the drawing is formed inside of a cup member 24 whose peripheral wall is provided with a plurality of through-holes 18b. The through-holes 18b are closed with closing members 25 made of stainless foil having a thickness of about 40 μm. The closing members 25 can be adhered by a mordant or an adhesive for example. The through-holes 18b can be formed in a bottom of the cup member 24 (i.e., in the filter means accommodating chamber 8 side). However, in order to prevent flame and gas generated in the first combustion chamber 6a from directly ejecting, it is preferable to form the through-holes 18b in the peripheral wall 33 as in this embodiment. As shown in this embodiment, when the through-holes 18b are formed in the peripheral wall 33 of the cup member 24, a flow path 27 extending from the through-holes 18b to the filter means accommodating chamber 8 is formed between an outer peripheral surface of the cup member 24 and an inner peripheral surface of the housing 3. The flow path 27 between the inner peripheral surface of the housing 3 and the outer peripheral surface of the cup member 24 can be obtained, for example, by making an outer diameter of the cup member 24 smaller in part extending from the through-holes 18b to the filter means accommodating chamber 8 to secure a space 27 between the inner peripheral surface of the housing 3 and the outer peripheral surface of the cup member 24 as shown in this embodiment. Single-perforated first gas generating agents 5b are accommodated in the second combustion chamber 6b, and are supported by a plate member 23 accommodated in the second combustion chamber 6b like the first gas generating agents 5a.

In this embodiment, gas generating agents having different shapes are used as the first gas generating agent 5a and the second gas generating agents 5b. Naturally, the same gas generating agents can be used in both the combustion chambers 6a and 6b, but the respective combustion chambers have gas generating agents in different shapes from each other as in this embodiment, operation performance of the gas generator (i.e., developing pattern of the air bag) can variously be adjusted. Further, as another option, when the respective combustion chambers accommodates the gas generating agents in the same shape but different from each other in at least one of a burning rate, a composition, a composition ratio and an amount, the operation performance of the gas generator can variously be adjusted like the present embodiment.

A cylindrical filter means 7 is accommodated in the filter means accommodating chamber 8. In this embodiment, the filter means 7 is formed by winding an expanded metal in many times. Another example of the filter means 7 can be a coolant/filter which is obtained by using laminated wire mesh body and has a cooling effect of the combustion gas and a function for collecting combustion residues. The filter means 7 is supported by and fixed to a filter means supporting member 28, and a gap 32 having a predetermined width is secured between an outer peripheral surface of the filter means 7 and the inner peripheral surface of the housing 3. In the present embodiment, the filter means supporting member 28 comprises an inner peripheral wall 29 fitted into a central opening of the filter means 7, an outer peripheral wall 30 extending into a direction opposite from the inner peripheral wall 29 and fitted into an inner peripheral surface of the housing, and an circular portion 31 for connecting the inner peripheral wall 29 and the outer peripheral wall 30. The filter means 7 is supported and fixed in the inner peripheral end surfaces thereof by the filter means supporting members 28 fitted into the housing 3. The gap 32 obtained between the outer peripheral surface of the filter means 7 and the inner peripheral surface of the housing 3 functions as a gas flow path so that the combustion gas is prevented from concentrating in the vicinity of the gas discharging port 4 when the combustion gas passes through the filter means 7. In the present embodiment, the outer peripheral surface of the filter means supporting member 28 provided in the first combustion chamber 6a side is supported and fixed by an emboss structure provided on the housing 3 or by press-fitting.

An actuation pattern of the gas generator shown in the drawings will be described below.

First, when the first ignition means 26a is actuated, a flame generated therefrom passes through the flame-transferring tube 13, and ejects into the first combustion chamber 6a from the flame-transferring holes 15a. This flame ignites and burns the first gas generating agents 5a to generate a combustion gas. Actuation gas generated by the combustion of the first gas generating agents 5a passes through the through-holes 18a of the baffling member 17 and reaches the filter means accommodating chamber 8. While the actuation gas passes through the filter means 7, the gas is purified and cooled and flows into the gap 32, and the actuation gas ruptures the seal tape 9 and is discharged from the gas discharging port 4. The second gas generating agents 5b accommodated in the second combustion chamber 6b are never ignited and burnt by the combustion of the first gas generating agents 5a because the through-holes 18b of the cup member 24 is closed by the rupturable member. The second gas generating agents 5b are ignited and burnt by the actuation of the second ignition means 26b. However, if automatic ignition material (AIM) which is ignited and burnt by the combustion heat (transferred heat) of the first gas generating agent 5a transferred from the housing 3 or the like is disposed in the second combustion chamber 6b, the second gas generating agents 5b can be ignited and burnt by the automatic ignition means. Nitrocellulose or the like can be used as the automatic ignition means. And the automatic ignition means is disposed so that the second gas generating agents 5b are ignited and burnt 100 milliseconds or more behind after the first ignition means 26a was actuated.

The second ignition means 26b is actuated simultaneously with the first ignition means 26a or later at a predetermined interval than the actuation of the first ignition means 26a. As a result, the ignition timings of the two ignition means 26a and 26b are adjusted. That is, the output performance (operation performance) of the gas generator can arbitrarily be adjusted by actuating the second ignition means 26b after actuation of the first ignition means 26a or by actuating the first ignition means 26a and the second ignition means 26b simultaneously. Thus, in various situations such as a vehicle speed or environment temperature at the time of collision, it is possible to optimize the development of the air bag when an air bag apparatus which will be described later is used.

If the second ignition means 26b is actuated, a flame generated therefrom ejects into the second combustion chamber 6b from the flame-transferring holes 15b of the cover member 16, ignites and burns the second gas generating agent 5b to generate an actuation gas. The actuation gas peels off the closing members 25 and ejects from the through-holes 18b of the cup member 24, passes through the flow path 27 formed between the cup member 24 and the housing 3 and reaches the filter means accommodating chamber 8. Thereafter, the actuation gas passes through the filter means 7 and is discharged from the gas discharging port 4 like the combustion gas generated from the first gas generating agent 5a.

Embodiment 2

Figure 5:
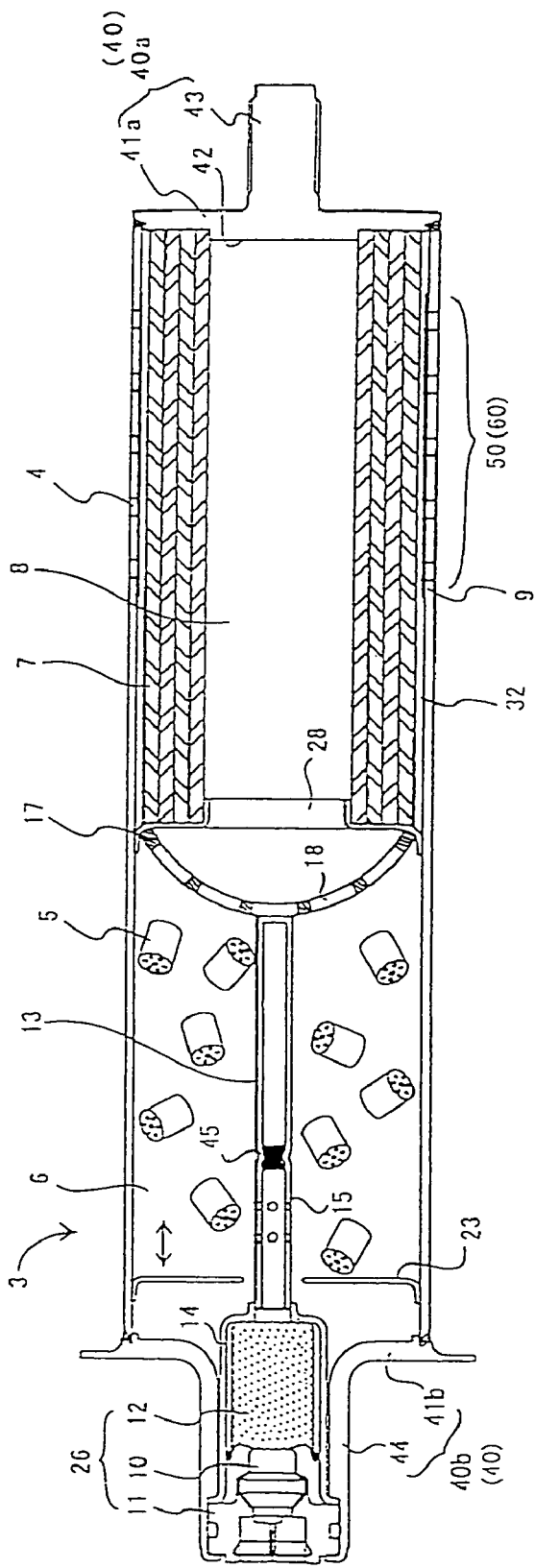
FIG. 5 is a cross sectional view showing a gas generator for an air bag of other embodiment in the longitudinal direction.

FIG. 5 is a vertical cross sectional view of other embodiment of a gas generator for an air bag according to the present invention.

This gas generator has a housing 3 formed by integrally uniting a cylindrical diffuser shell 1 having a gas discharging port 4 and a closure shell 40 which closes openings in the ends of the diffuser shell 1 in the same manner as the gas generator shown in FIG. 1. However, the filter means accommodating chamber 8 is disposed in a different place, and the filter means accommodating chamber 8 is defined at the end of the housing 3. One combustion chamber 6 for accommodating the gas generating agent 5 is defined at the other end of the housing 3. Therefore, in this embodiment, the combustion chamber 6 and the filter means accommodating chamber 8 are adjacently provided in the housing 3 in the axial direction.

The combustion chamber 6 formed at the one end of the housing 3 is separated from the filter means accommodating chamber 8 by a partition member. Like Embodiment 1, a baffling member 17 curved into a convex shape toward the combustion chamber 6 is used as this partition member. This baffling member 17 is formed with a plurality of through-holes 18 which communicates the combustion chamber 6 with the filter means accommodating chamber 8, and both the chambers 6 and 8 are always in communication with each other. Moisture-proof of the gas generating agents 5 accommodated in the combustion chamber 6 and rust proofing of inner metal member are achieved by sealing the gas discharging ports 4 formed in the peripheral wall of the cylindrical housing 3 and thus, the sealing structure in the combustion chamber 6 side can be simplified. Naturally, even in this embodiment, if it is unnecessary to simplify the sealing structure, the through-holes 18 may also be closed with seal tapes which are ruptured by combustion of the gas generating agent.

The porous cylindrical gas generating agents 5 are accommodated in the combustion chamber 6, and the gas generating agents 5 are supported between a baffling member 17 and an inwardly flange-like-shaped plate member 23. With this design, movement of the gas generating agents 5 is blocked and thus, the gas generating agents 5 can be prevented from being damaged due to vibration or the like. This plate member 23 can slide in the axial direction of the housing 3. Therefore, even if the amount of the accommodated gas generating agents 5 is varied, movement of the gas generating agents 5 can be reliably blocked.

In this embodiment also, the diffuser shell 1 constituting the housing 3 is formed with a cylindrical straight tube. In a part of the peripheral wall in which the filter means accommodating chamber 8 is provided, a plurality of the gas discharging ports 4 are arranged. The gas discharging ports are aligned straight in the axial direction of the housing 3 in the same manner as Embodiment 1 to form a gas discharging port line 50 or a gas discharging port group 60 in which two to six gas discharging lines 50 are arranged close to each other.

As in Embodiment 1, the gas discharging ports 4 are closed with a band-like seal tape 9 extending straight along the axial direction of the housing 3, and the moisture-proof in the housing 3 as well as in the combustion chamber 6 is achieved. Also in the present embodiment, the gas discharging port 4 can easily and unfailingly be closed because the seal tape 9 can be attached straight along the axial direction of the housing 3.

A closure shell 40a for closing the opening of the diffuser shell 1 in the filter means accommodating chamber 8 side comprises an annular portion 41a connected to an opening edge of the diffuser shell 1, an circular portion 42 projecting from the annular portion 41a toward the filter means accommodating chamber 8, and a screw portion 43 projecting from the annular portion 41a outwardly in the axial direction of the housing 3. The circular portion 42 is adjusted to a size capable of being abutted against the inner peripheral surface of the filter means 7, and functions to support the filter means 7. By providing the screw portion 43 with a nut (not shown), the gas generator can be mounted to a module case.

Meanwhile, a closure shell 40b for closing the opening of the diffuser shell 1 in the combustion chamber 6 side comprises an annular portion 41b connected to the opening end of the diffuser shell 1, and a cylindrical portion 44 integrally connected to a central opening of the annular portion 41b and projecting outwardly in the axial direction of the housing 3. An ignition means 26 comprising an igniter 10 accommodated in an igniter collar 11 and a transfer charge 12 to be ignited and burnt by the igniter 10 is accommodated in an interior of the cylindrical portion 44. A peripheral edge of the annular portion 41b is formed such as to project outwardly in the radial direction of the diffuser shell 1. Therefore, the peripheral edge of the annular portion 41 can function as a flange portion when the gas generator is mounted to the module.

The cylindrical portion 44 of the closure shell 40b is closed with a cap member 14 connected to an end of the flame-transferring tube 13. The flame-transferring tube 13 connected to the cap member 14 is provided at its peripheral wall with a plurality of flame-transferring holes 15, and the interior of the flame-transferring tube 13 communicates with an interior of the cylindrical portion 44 of the closure shell 2, i.e., with a space in which the ignition means 26 is accommodated. With this design, a flame generated by the actuation of the ignition means 26 passes through the flame-transferring tube 13 and ejects into the combustion chamber 6 from a flame-transferring hole 15. In this embodiment, the flame-transferring tube 13 is blocked with a stopper 45 in the closer to the end (i.e., in the filter means accommodating chamber 8 side) than the region which has the flame-transferring hole 15. The stopper 45 blocks the flame-transferring tube 13 in the interior not involved in the flame-transferring holes 15 and thereby an unnecessary space at the time of igniting the transfer charge is eliminated to increase the pressure inside the space accommodating the ignition means, and in result, an ignitability of the transfer charge 12 is improved.

As in Embodiment 1, a cylindrical filter means 7 is accommodated in the filter means accommodating chamber 8. The end of the filter means 7 in the combustion chamber 6 side is supported by and fixed to a filter means supporting member 28, and the other end of the filter means 7 is supported by and fixed to the circular portion 42 of the closure shell 40a which closes the opening in the filter means accommodating chamber 8 side. With this design, a gap 32 having a predetermined width is obtained between the outer peripheral surface of the filter means 7 and the inner peripheral surface of the housing 3. This gap 32 functions as a gas-flow path, and when a combustion gas passes through the filter means 7, the gap 32 prevents the combustion gas from being concentrated near the gas discharging ports 4.

The gas generator actuates as follows. When the igniter 10 is actuated to ignite and burn the transfer charge 12, a flame thereof passes through the flame-transferring tube 13 and ejects into the combustion chamber 6 through the flame-transferring hole 15. The flame ignites and burn the gas generating agent 5 in the combustion chamber 6 to generate an actuating gas. And the gas flows into the filter means accommodating chamber 8 through the through-holes 18 of the baffling member 17. Thereafter, while the actuation gas passes through the filter means 7, the gas is purified and cooled, and ruptures the seal tape 9 closing the gas discharging port 4, and is discharged from the gas discharging port 4.

Embodiment 3

Figure 6:
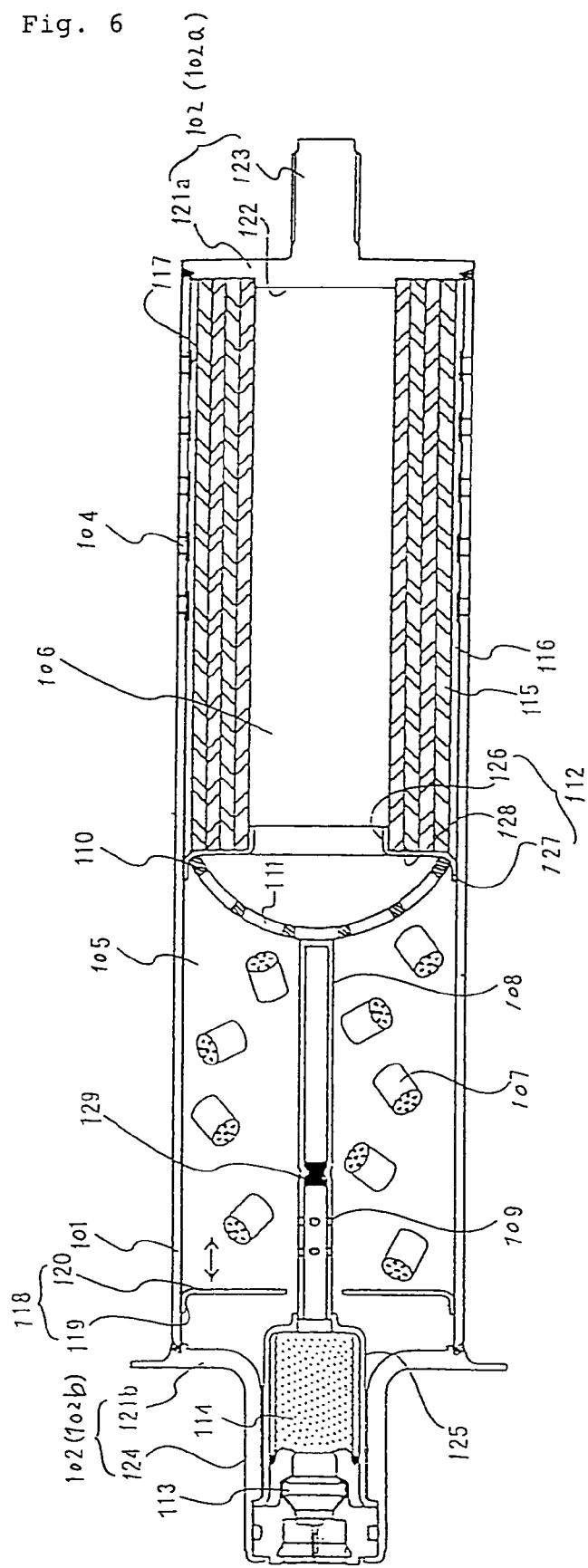
FIG. 6 is a cross sectional view showing one embodiment of a gas generator (2) for an air bag of the present invention on the longitudinal direction of the gas generator.

FIG. 6 is a vertical cross sectional view of one embodiment of a gas generator for an air bag according to the present invention. In the gas generator of this embodiment, a combustion chamber and a filter means accommodating chamber are adjacent to and communicate with each other in the axial direction, and a gas generating means in the combustion chamber is supported by a plate member, and a flame-transferring tube projects in the combustion chamber.

This gas generator has a housing 103 formed by integrally joining a cylindrical diffuser shell 101 having a gas discharging port 104 and a closure shell 102 which closes openings in ends of the diffuser shell 102. In this housing 103, a combustion chamber 105 for accommodating gas generating agents 107 and a filter means accommodating chamber 106 for accommodating a cylindrical filter means 115 are adjacently provided in an axial direction of the housing 103.

The combustion chamber 105 formed at an end of the housing 103 is separated from the filter means accommodating chamber 106 by a partitioning member. In the present embodiment, a baffling member 110 curved into a convex shape toward the combustion chamber is used as the partitioning member. The baffling member 110 has a function for blocking movement of the gas generating agents 107 toward the filter means accommodating chamber 106. The baffling member 110 is formed with a plurality of through-holes 111 which makes the combustion chamber 105 communicate with the filter means accommodating chamber 106 so that an actuation gas generated by combustion of the gas generating agents 107 is sent to the filter means accommodating chamber 106. In the present embodiment, since the through-hole 111 is not closed with a seal tape 117 and the like, the combustion chamber 105 and the filter means accommodating chamber 106 always communicates with each other. Moisture-proof of the gas generating agents 107 accommodated in the combustion chamber 105 and rust proofing of inner metal member are achieved only by sealing a plurality of gas discharging ports 104 formed in the peripheral wall of the cylindrical housing 103 and therefore, the sealing structure in the combustion chamber 105 side can be simplified. In case that simplifying the sealing structure is not exactly an object, for example, in a gas generator in which the combustion chamber is separated from the filter means accommodating chamber by the baffling member, a gas generator in which the gas generating agent is pressed and held by the plate member, and/or a gas generator in which the flame-transferring tube projects in the combustion chamber, the through-hole of the baffling member can be naturally closed with a seal tape which is to be ruptured by a combustion of the gas generating agents. In this case, the combustion chamber and the filter means accommodating chamber are formed such that they can communicate with each other. That is, in the present invention, the combustion chamber and the filter means accommodating chamber may always communicate with each other or they may be made to communicate with each other by a combustion of the gas generating agents, as required.

A porous cylindrical gas generating agent 107 is accommodated in the combustion chamber 105. The gas generating agent 107 is supported between the baffling member 110 and an inwardly shaped flange-like plate member 118. With this design, movement of the gas generating agent 107 is blocked so that the gas generating agent 107 can be prevented from being damaged due to vibration or the like. In the present embodiment, a peripheral wall 119 of the plate member 118 is fitted into the combustion chamber 105, and the gas generating agent 107 is supported by a flange-like portion 120 connected to the peripheral wall 119. Since the plate member 118 can slide in the axial direction of the housing 103, even if the amount of the accommodated gas generating agent 107 is varied, movement of the gas generating agent 107 can be unfailingly blocked.

The baffling member 110 having the through-hole 111 supports the gas generating agent 107 accommodated in the combustion chamber 105 and prevents the gas generating agents 107 from moving into the filter means accommodating chamber 106. The baffling member 110 does not have a function to control the combustion internal pressure in the first combustion chamber 105. Therefore, the through-holes 111 are adjusted such that an inner diameter thereof is smaller than the first gas generating agent 107, and a total opening area of the through-holes 111 are greater than a total opening area of the gas discharging ports 104.

The diffuser shell 101 constituting a portion of the housing 103 is formed using a cylindrical straight tube. In a part of peripheral wall of the diffuser shell 101 where the filter means accommodating chamber 106 is provided, a plurality of the gas discharging ports 104 are formed. The gas discharging port 104 is closed with a seal tape 117 made of aluminum for preventing moisture. The gas discharging port 104 has a function to control the internal pressure of the housing 103 at the time of combustion of the gas generating agents 107. The total opening area of the gas discharging ports 104 is determined based on characteristics and the like of the gas generating agents 107 accommodated in each of the combustion chambers 105.

A closure shell 102a for closing an opening of the diffuser shell 101 in the filter means accommodating chamber 106 side comprises an annular portion 121 connected to an opening edge of the diffuser shell 101, an circular portion 122 projecting from the annular portion 121 toward the filter means accommodating chamber 106, and a screw portion 123 projecting from the annular portion 121 outwardly in the axial direction of the housing 103. The circular portion 122 is adjusted to a size capable of being abutted against the inner peripheral surface of the filter means 115, and functions to support the filter means 115. By providing a nut (not shown) with the screw portion 123, the gas generator can be mounted to a module case.

Meanwhile, a closure shell 102b for closing an opening of the diffuser shell 101 in the combustion chamber 105 side comprises an annular portion 121b connected to the opening end of the diffuser shell 101, and a cylindrical portion 124 integrally connected to a central opening of the annular portion 121b and projecting outwardly in the axial direction of the housing 103. An ignition means comprising an igniter 113 accommodated in an igniter collar, and a transfer charge 114 to be ignited and burnt by the igniter 113 are accommodated in the inner space of the cylindrical portion 124. A peripheral edge of the annular portion 121b is formed such as to project outwardly in the radial direction of the diffuser shell 101. Therefore, the peripheral edge can function as a flange portion when the gas generator is mounted to the module.

The cylindrical portion of the closure shell 102 is closed with a cap member 125 connected to an end of the flame-transferring tube 108. The flame-transferring tube 108 connected to the cap member 125 is formed at its peripheral wall with a plurality of flame-transferring holes 109, and the interior of the flame-transferring tube 108 communicates with the interior of the cylindrical portion 124 of the closure shell 102, i.e., with a space where the ignition means 113 is accommodated. The flame-transferring tube 108 projects into the combustion chamber 105 through a central opening of an inwardly shaped flange-like plate member 118 which supports the gas generating agents 107, and the flame-transferring hole 109 formed in the peripheral wall of the flame-transferring tube 108 is arranged to be inside the combustion chamber 105. With this design, a flame generated by the actuation of the ignition means passes through the flame-transferring tube 108 and ejects into the combustion chamber 105 through the flame-transferring hole 109. The plate member 118 is fitted into the housing 103 and can slide in the longitudinal direction of the housing 103. Even when the position of the plate member 118 is changed in accordance with the amount of the gas generating agents 107 accommodated in the combustion chamber 105, it is possible to reliably ignite and burn the gas generating agents 107 with the flame ejected from the flame-transferring tube 109. In the present embodiment, the portion of the flame-transferring tube 108 is blocked with a stopper 129 in the closer to the end than the region where the flame-transferring hole is formed (i.e., in the filter means accommodating chamber 106 side).

The stopper 129 blocks the flame-transferring tube 108a in the interior not involved with the flame-transferring hole 109, and thereby an unnecessary space at the time of igniting the transfer charge is eliminated to increase the pressure inside the space accommodating the ignition means, and in result, an ignitability of the transfer charge 114 is improved.

A cylindrical filter means 115 is accommodated in the filter means accommodating chamber 106. In the present embodiment, the filter means 115 is formed by winding an expanded metal many times. The filter means 115 can also be formed with a laminated wire mesh body so that the filter means 115 can serve as a coolant/filter having cooling effect of a combustion gas as well as a function for collecting combustion residues. The end of the filter means 115 in the combustion chamber 105 side is supported by and fixed to the filter means supporting member 112, and the other end of the filter means 115 is supported by and fixed to the circular portion 122 of the closer shell 102b which closes an opening in the filter means accommodating chamber 106 side. With this design, a gap 116 having a predetermined width is obtained between the outer peripheral surface of the filter means 115 and the inner peripheral surface of the housing. In the present embodiment, the filter means supporting member 112 comprises an inner peripheral wall 126 fitted into an central opening of the filter means 115, an outer peripheral wall 127 extending in the opposite direction of the inner peripheral wall and fitted into an inner peripheral surface of the housing 103, and an annular portion 128 connecting the inner peripheral wall and the outer peripheral wall. The filter means supporting member 112 is fixed inside the housing 103 by an emboss structure provided in the housing 103 or press-fitting. The gap 116 secured between the outer peripheral surface of the filter means 115 and the inner peripheral surface of the housing 103 functions as a gas-flow path, and this prevent a combustion gas from being concentrated near the gas discharging port 104 when the combustion gas passes through the filter means 115.

This gas generator actuates as follows. The igniter 113 is actuated to ignite and burn the transfer charge 114, a flame passes through the flame-transferring tube 108 and ejects into the combustion chamber 105 through the flame-transferring hole 109. The flame ignites and burn the gas generating agent 107 in the combustion chamber 105 to generate an actuation gas, and the gas flows into the filter means accommodating chamber 106 through the through-holes 111 of the baffling member 110. Thereafter, while the actuation gas passes through the filter means 115, the gas is purified and cooled, and ruptures the seal tape 117 which closes the gas discharging port 104, and is discharged from the gas discharging port 104.

Embodiment 4

Figure 7:
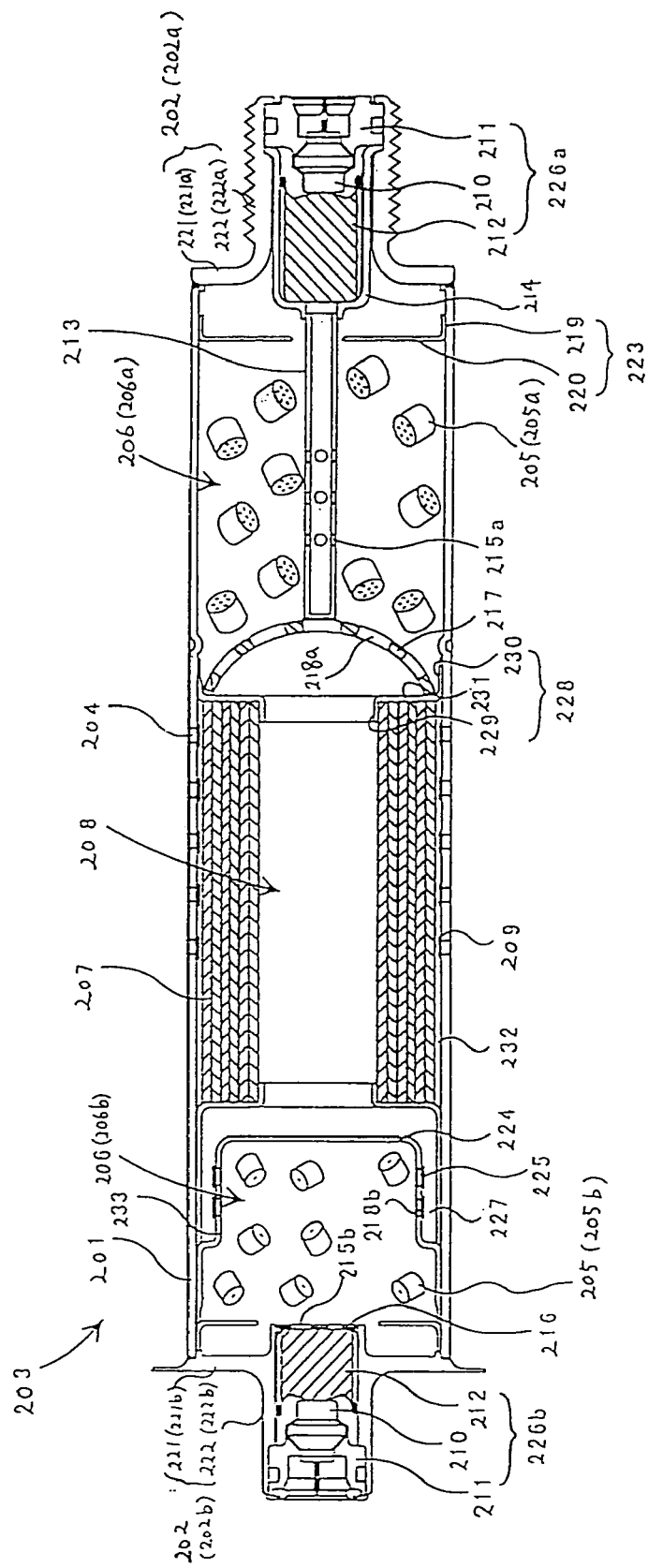
FIG. 7 is a vertical cross sectional view showing one embodiment of a gas generator (3) of the invention.

FIG. 7 is a vertical cross sectional view of one embodiment of a gas generator for an air bag according to the present invention.

This gas generator has a housing 203 formed by integrally joining a cylindrical diffuser shell 201 having a gas discharging port 4 and closure shells 202 which close openings in ends of the diffuser shell 201. In the housing 203, combustion chambers 206 for accommodating gas generating agents 205 as a gas generating means are formed on the both sides (i.e., the closure shells side) in the axial direction. A filter means accommodating chamber 208 for accommodating a cylindrical filter means 207 is provided between the combustion chambers 206, i.e., in the vicinity of the center of the housing 203. In the present embodiment, for convenience of explanation, the right side combustion chamber in the drawing is defined as a first combustion chamber 206a and the left side combustion chamber is defined as a second combustion chamber 206b. The first combustion chamber 206a communicates with the filter means accommodating chamber 208.

The diffuser shell 201 is formed with a cylindrical straight tube. In a part of the peripheral wall of the diffuser shell 201 where the filter means accommodating chamber 208 is provided, a plurality of the gas discharging ports 204 are formed. The gas discharging port 204 is closed with a seal tape 209 made of aluminum for moisture-proofing. The gas discharging port 204 has a function to control the internal pressure of the housing 203 at the time of combustion of the gas generating agents 205. The total opening area of the gas discharging ports 204 is determined based on characteristics and the like of the gas generating agents 205 accommodated in each of the combustion chambers 206.

The closure shell 202 comprises an annular portion 221 connected to an opening end of the diffuser shell 201, and a cylindrical portion 222 integrally connected to a central opening of the annular portion 221. The cylindrical portion 222 projects outwardly in the axial direction of the housing 203, and an ignition means 226 is accommodated in the interior thereof. In the present embodiment, the first closure shell 202a foreclosing an end opening in the first combustion chamber 206a side comprises a cylindrical portion 222a and an annular portion 221a connected in a flange-like shape to an end of the cylindrical portion 222a. The second closure shell 202b for closing an end opening in the second combustion chamber 206b side comprises a cylindrical portion 222b, and an annular portion 221a intersecting in a flange-like shape at right angles with a peripheral wall of the cylindrical portion 222b. First and second ignition means 226a and 226b are respectively accommodated in the cylindrical portions 222a and 222b of the first and second closure shells 202a and 202b. Each the ignition means comprises an igniter 210 accommodated in an igniter collar 211 and a transfer charge 212 to be ignited and burnt by the igniter 210. The cylindrical portion 222a of the first closure shell 202a is closed with a cap member 214 connected to an end of the flame-transferring tube 213. The cylindrical portion 222b of the second closure shell 202b is closed with a porous disk-like cover member 216 having a plurality of flame-transferring holes 215b in the second combustion chamber 206b side. The flame-transferring tube 213 connected to the cap member 214 is formed at its peripheral wall with a plurality of flame-transferring holes 215a, and an interior thereof communicates with the cylindrical portion 222a of the first closure shell 202a.

In the present embodiment, a peripheral edge of the annular portion 221b forming the second closure shell 202b is formed to project outwardly in the radial direction of the diffuser shell 201. With this design, the annular portion 221b can function as a flange portion when the gas generator is mounted to the module. A screw groove (screw groove having a pitch of 1.0 mm with respect to a diameter of 22 mm of the cylindrical portion 222a for example) is formed in an outer peripheral surface of the cylindrical portion 222a of the first closure shell 202a. As a result, if a nut is incorporated in the cylindrical portion 222a, it can function as a stud bolt when the gas generator is mounted to a module case.

The first combustion chamber 206a formed on the right side of the housing 203 in the drawing is separated from the filter means accommodating chamber 208 by a partitioning member. In the present embodiment, a baffling member 217 curved into a convex shape toward a first ignition means 226a is used as the partitioning member. The baffling member 217 has a function for blocking movement of gas generating agents 205a toward the filter means accommodating chamber 208. And a plurality of through-holes 218a are formed in the baffling means 217 to make the combustion chamber 206a communicate with the filter means accommodating chamber 208 so that an actuation gas generated by the combustion of the gas generating agents 205a is sent to the filter means accommodating chamber 208. The through-hole 218a is not closed by the seal tape or the like but is opened. Alternatively, as another mode, the through-hole may be closed with the seal tape or the like so that the seal tape is ruptured by combustion of the gas generating agents to make both chambers communicate with each other. In other words, the first combustion chamber 206a and the filter means accommodating chamber 208 always communicates with each other, or are made to be able to communicate with each other. With this design, moisture-proof of the gas generating agents 205a accommodated in the first combustion chamber 206a and rust proofing of inner metal member can be achieved only by sealing the gas discharging port 204 formed in the peripheral wall of the cylindrical housing 203, and therefore, the sealing structure can be simplified. A porous cylindrical gas generating agent 205a is accommodated in the first combustion chamber 206a. The gas generating agent 205a is supported by an inwardly shaped flange-like plate member 223 in which the flame-transferring tube 213 passes through the central opening thereof. A peripheral wall 219 of the plate member 223 is fitted into the combustion chamber 206a, and the gas generating agent 205a are supported by the flange-like portion 220 connected to the peripheral wall 219. With this design, movement of the gas generating agent 205a is blocked so that the gas generating agent 205a can be prevented from being damaged due to vibration or the like. Further, since the plate member 223 is fitted into the housing 203 such that the plate member 223 can slide in the axial direction of the housing 203, even if the amount of the accommodated gas generating agents 205a is varied, the gas generating agents 205a can reliably be supported, pressed and/or held.

The gas generating agent 205a accommodated in the combustion chamber 206a is supported by the plate member 223 and a flame of the ignition means 226a is reliably ejected into the combustion chamber 206a by the flame-transferring tube 213. Therefore, even if the amount of the gas generating agent 205a accommodated in the combustion chamber 206a is varied, the gas generating agent 205a is unfailingly be ignited and burnt.

The baffling member 217 having the through-hole 218a supports the gas generating agent 205a accommodated in the first combustion chamber 206a to block movement of the gas generating agent 205a towards the filter means accommodating chamber 208. The baffling member 217 does not have a function to control the combustion internal pressure in the first combustion chamber 206a. Therefore, the through-hole 218a is adjusted such that inner diameter thereof is smaller than the first gas generating agent 205a, and a total opening area of the through-holes 218a is greater than a total opening area of the gas discharging ports 204.

Further, the second combustion chamber 206b formed on the left side of the housing 203 in the drawing is formed inside of a cup member 224 provided at its peripheral wall with a plurality of through-holes 218b. The through-hole 218b is closed with a closing member 225 made of stainless foil having a thickness of about 40 $\mu$m. The closing members 225 can be adhered using a mordant or an adhesive for example. The through-holes 218b can also be formed in the bottom of the cup member 224 (i.e., in the filter means accommodating chamber 208 side). In order to prevent a flame and a gas generated in the first combustion chamber 206a from directly ejecting, it is preferable to form the through-hole 218b in the peripheral wall 233 as in the present embodiment. As shown in the present embodiment, when the through-holes 218b are formed in the peripheral wall 233 of the cup member 224, a flow path 227 connected from the through-holes 218b to the filter means accommodating chamber 208 is formed between an outer peripheral surface of the cup member 224 and an inner peripheral surface of the housing 203. The flow path 227 between the inner peripheral surface of the housing 203 and the outer peripheral surface of the cup member 224 can be obtained, for example, by making an outer diameter of the cup member 224 smaller in part extending from the through-holes 218b to the filter means accommodating chamber 208 to secure a space 227 between the inner peripheral surface of the housing 203 and the outer peripheral surface of the cup member 224 as shown in this embodiment. A single-perforated first gas generating agents 205b is accommodated in the second combustion chamber 206b, and is supported by a plate member 223 accommodated in the second combustion chamber 206b like the first gas generating agent 205a.

In the present embodiment, gas generating agents having different shapes are used as the first gas generating agent 205a and the second gas generating agents 205b. Naturally, the same gas generating agents can be used in the combustion chambers 206a and 206b, however, the respective combustion chambers have the gas generating agents in different shapes as in this embodiment, operation performance of the gas generator (i.e., developing pattern of the air bag) can variously be adjusted. Alternatively, even if the respective combustion chambers 206a and 206b use the gas generating agents in the same shape, the operation performance of the gas generator can be variously adjusted by using the gas generating agents which are different in at least one of a burning rate, composition, composition ratio and amount for the respective chambers.

A cylindrical filter means 207 is accommodated in the filter means accommodating chamber 208. In the present embodiment, the filter means 207 is formed by winding an expanded metal many times. The filter means 207 can also be formed using laminated wire mesh body so that the filter means 207 can serve as a coolant/filter having a cooling effect of a combustion gas and a function for collecting combustion residues. The filter means 207 is supported by and fixed to a filter means supporting member 228, and a gap 232 having a predetermined width is secured between an outer peripheral surface of the filter means 207 and the inner peripheral surface of the housing 203. In the present embodiment, the filter means supporting member 228 comprises an inner peripheral wall 229 fitted into a central opening of the filter means 207, an outer peripheral wall 230 extending into the opposite direction of the inner peripheral wall 229 and fitted into an inner peripheral surface of the housing, and an annular portion 231 for connecting the inner peripheral wall 229 and the outer peripheral wall 230. The filter means 207 is supported by and fixed in the inner peripheral end surfaces thereof by the filter means supporting member 228 fitted into the housing 203. The gap 232 secured between the outer peripheral surface of the filter means 207 and the inner peripheral surface of the housing 203 functions as a gas-flow path for preventing the combustion gas from being concentrated in the vicinity of the gas discharging port 204 when the combustion gas passes through the filter means 207. In the present embodiment, the outer peripheral surface of the filter means supporting member 228 provided in the first combustion chamber 206a side is supported by and fixed to an emboss structure provided with the housing 203 or press-fitting.

An actuation mode of the gas generator shown in the drawings will be described below.

First, when the first ignition means 226a is actuated, a flame generated there from passes through the flame-transferring tube 213, and ejects into the first combustion chamber 206a through the flame-transferring holes 215a. The flame ignites and burns the first gas generating agents 205a to generate a combustion gas. The actuation gas generated by the combustion of the first gas generating agents 205a directly passes through the through-holes 218a of the baffling member 217 and reaches the filter means accommodating chamber 208. While the actuation gas passes through the filter means 207, the gas is purified and cooled, and flows into the gap 232. Then, the actuation gas ruptures the seal tape 209 and is discharged from the gas discharging ports 204. The second gas generating agents 205b accommodated in the second combustion chamber 206b are not ignited and burnt by the combustion of the first gas generating agents 205a because the through-hole 218b of the cup member 224 is closed by the rupturable member. The second gas generating agents 205b are ignited and burnt by the actuation of the second ignition means 226b. However, if an automatic ignition material (AIM) which is ignited and burnt by the combustion heat (transferred heat) of the first gas generating agent 205a transferred from the housing 203 or the like is disposed in the second combustion chamber 206b, the second gas generating agents 205b can be ignited and burnt by the automatic ignition means. Nitrocellulose or the like can be used as the automatic ignition means, and the automatic ignition means is arranged so that the second gas generating agent 205b is ignited and burnt at least 100 milliseconds after the first ignition means 226a has been actuated.

The second ignition means 226b is actuated simultaneously with the first ignition means 226a, or later at a predetermined interval than the actuation of the first ignition means 226a. As a result, the ignition timings of the two ignition means 226a and 226b are adjusted. That is, the output performance (operation performance) of the gas generator can be arbitrarily adjusted by actuating the second ignition means 226b after actuation of the first ignition means 226a or by actuating the first ignition means 226a and the second ignition means 226b simultaneously. Thus, in various situations including such as a vehicle speed or a environment temperature at the time of collision, the development of the air bag can be optimized in an air bag apparatus which will be described later.

When the second ignition means 226b is actuated, a flame generated therefrom ejects into the second combustion chamber 206b through the flame-transferring holes 215b of the cover member 216, and then, ignites and burns the second gas generating agent 205b to generate an actuation gas. The actuation gas peels off the closing members 225 and ejects from the through-holes 218b of the cup member 224, passes through the flow path 227 obtained between the cup member 224 and the housing and reaches the filter means accommodating chamber 208. Thereafter, the actuation gas passes through the filter means 207 and is discharged from the gas discharging port 204 like the combustion gas generated from the first gas generating agent 205a.

Embodiment 5

Figure 8:
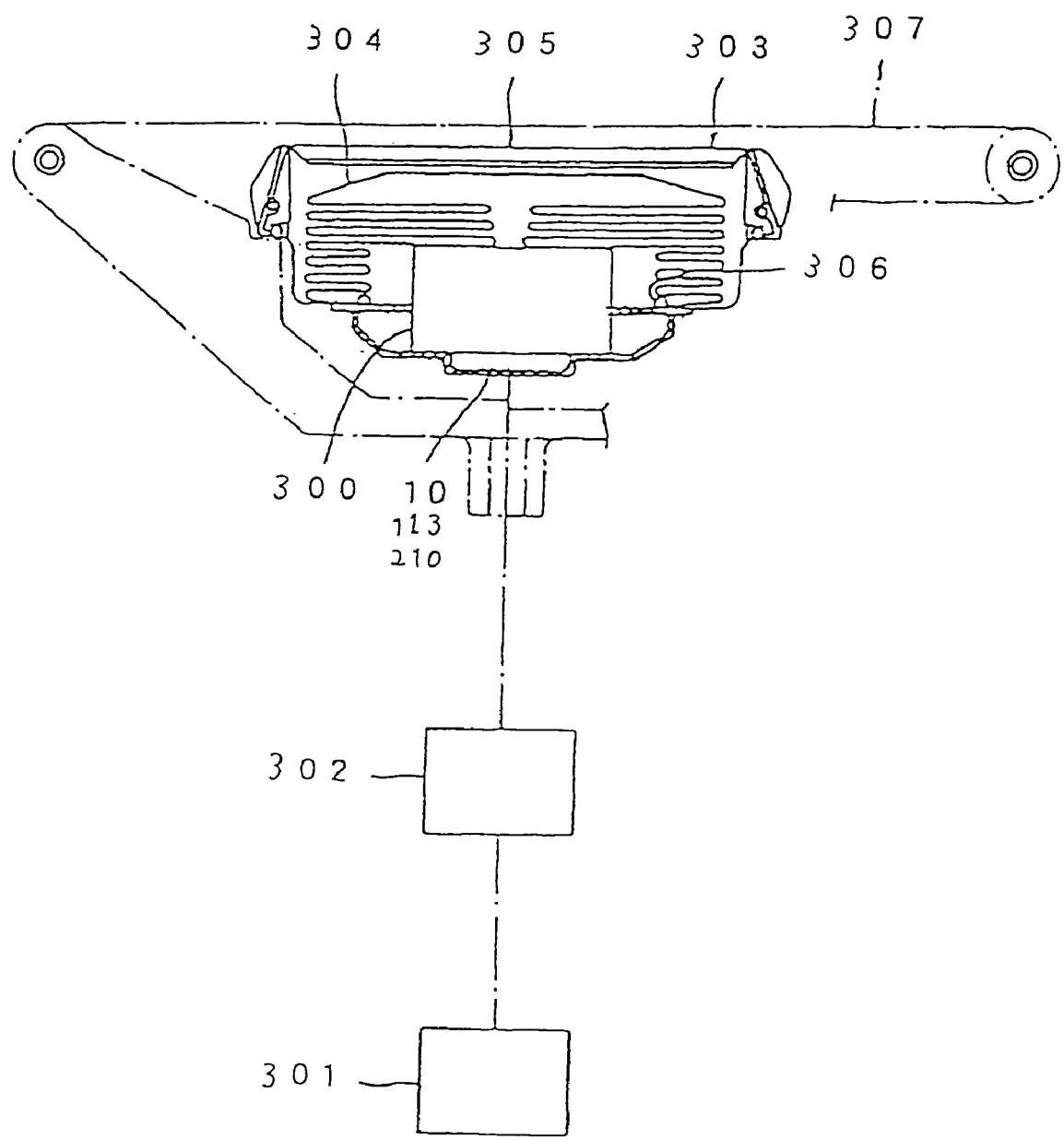
FIG. 8 is a schematic view showing an air bag apparatus of the invention.

FIG. 8 shows an embodiment of an air bag apparatus of the present invention including a gas generator using an electric-ignition type ignition means.

The air bag apparatus comprises a gas generator 300, an impact sensor 301, a control unit 302, a module case 303 and an air bag 304. The gas generator explained based on FIGS. 1, 6 or 7 is used as the gas generator 300, and its actuation performance is adjusted to give as a small impact as possible to the passenger in the initial stage of the actuation in the gas generator.

The impact sensor 301 comprises a semiconductor type acceleration sensor. The semiconductor type acceleration sensor comprises four semiconductor gages formed on a beam of a silicon substrate which bends when acceleration is applied thereto. The semiconductor gages are bridge-connected. If the acceleration is applied, the beam bends, and a strain is generated on its surface. With this strain, resistance of the semiconductor gage is varied, and the variation in resistance is detected as a voltage signal corresponding to the acceleration.

The control unit 302 includes an ignition judging circuit. A signal from the semiconductor type acceleration sensor is inputted to this ignition judging circuit. If the impact signal from the sensor 301 exceeds a certain value, the control unit 302 starts calculation, and if a result of the calculation exceeds a certain value, the control unit 302 outputs the actuation signal to the igniters 10, 113 and 210 of the gas generator 300.

The module case 303 is made of polyurethane for example, and includes a module cover 305. The air bag 304 and the gas generator 300 are accommodated in the module case 303 to constitute a pad module. When the pad module is mounted to a driver side of an automobile, the pad module is usually mounted in a steering wheel 307.

The air bag 304 is made of nylon (e.g., nylon 66) or polyester, a bag opening 306 of the air bag 304 surrounds the gas discharging ports of the gas generator, and the air bag 304 is fixed to a flange of the gas generator in a folded state.

When the semi conductor type acceleration sensor 301 detects an impact at the time of collision of the automobile, a signal therefrom is sent to the control unit 302, and if the impact signal from the sensor exceeds a certain value, the control unit 302 starts calculation. If the result of the calculation exceeds a certain value, the control unit 302 outputs the actuation signal to the igniters 10, 113 and 210 of the gas generator 300, thereby actuating the igniters 10, 113 and 210 to ignite the gas generating agents. And the gas generating agents are burnt to generate a gas. The gas ejects into the air bag, and the air bag breaks the module cover 305 to inflate, thereby forming a cushion between the steering wheel 307 and the passenger to absorb the impact.

What is claimed is:

1. A gas generator for an air bag comprising, in a cylindrical housing which is longer in the axial direction than in the radial direction, an ignition means to be actuated upon the impact, and a gas generating means to be ignited and burnt by the ignition means, wherein a combustion chamber for accommodating the gas generating means and a filter means accommodating chamber for accommodating a filter means are formed in the housing adjacent to each other in the axial direction and these chambers communicate with each other, wherein the combustion chamber accommodating the gas generating means is separated from the filter means accommodating chamber by a partitioning member having a through-hole, and wherein the cylindrical housing comprises a cylindrical diffuser shell provided at its peripheral wall with a plurality of gas discharging ports, and closure shells for closing the opposite end openings of the peripheral wall, the closure shell closing the opening in the filter means accommodating chamber side comprises an annular portion connected to an opening edge of the diffuser shell, a circular portion projecting from the annular portion toward the filter means accommodating chamber, and a screw portion projecting from the annular portion out of the housing, and the circular portion abuts against an inner peripheral surface of the filter means to support the filter means.

2. A gas generator for an air bag according to claim 1, wherein a filter supporting member which has an inner peripheral wall of an annular portion projecting into a hollow portion of the filter means and an outer peripheral wall fitted into the housing is disposed on the filter means in the combustion chamber side, and the filter means is supported by and fixed to the inner peripheral wall of the filter means supporting member and the circular portion of the closure shell.

3. A gas generator for an air bag comprising, in a cylindrical housing which is longer in the axial direction than in the radial direction, an ignition means to be actuated upon the impact, and a gas generating means to be ignited and burnt by the ignition means, wherein a combustion chamber for accommodating the gas generating means and a filter means accommodating chamber for accommodating a filter means are formed in the housing adjacent to each other in the axial direction, the gas generating means accommodated in the combustion chamber is pressed and/or held towards the filter means accommodating chamber side by an inwardly flange-shaped plate member fitted into the combustion chamber, and the plate member is slidable in the axial direction of the housing, and wherein the cylindrical housing comprises a cylindrical diffuser shell provided at its peripheral wall with a plurality of gas discharging ports, and closure shells for closing the opposite end openings of the peripheral wall, the closure shell closing the opening in the filter means accommodating chamber side comprises an annular portion connected to an opening edge of the diffuser shell, a circular portion projecting from the annular portion toward the filter means accommodating chamber, and a screw portion projecting from the annular portion out of the housing, and the circular portion abuts against an inner peripheral surface of the filter means to support the filter means.

4. A gas generator for an air bag according to claim 3, wherein a filter supporting member which has an inner peripheral wall of an annular portion projecting into a hollow portion of the filter means and an outer peripheral wall fitted into the housing is disposed on the filter means in the combustion chamber side, and the filter means is supported by and fixed to the inner peripheral wall of the filter means supporting member and the circular portion of the diffuser shell.

* * * * *